US011017679B2

(12) United States Patent
Moster et al.

(10) Patent No.: US 11,017,679 B2
(45) Date of Patent: May 25, 2021

(54) UNMANNED AERIAL VEHICLE VISUAL POINT CLOUD NAVIGATION

(71) Applicant: Skydio, Inc., Redwood, CA (US)

(72) Inventors: Joseph Moster, San Francisco, CA (US); Donna Okazaki, San Francisco, CA (US); Bernard J. Michini, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 618 days.

(21) Appl. No.: 15/869,659

(22) Filed: Jan. 12, 2018

(65) Prior Publication Data

US 2018/0204469 A1 Jul. 19, 2018

Related U.S. Application Data

(60) Provisional application No. 62/446,334, filed on Jan. 13, 2017.

(51) Int. Cl.
| | |
|---|---|
| *G08G 5/00* | (2006.01) |
| *G01C 21/00* | (2006.01) |
| *G05D 1/10* | (2006.01) |
| *B64C 39/02* | (2006.01) |
| *B64D 47/08* | (2006.01) |
| *G01C 11/02* | (2006.01) |
| *G05D 1/00* | (2006.01) |

(52) U.S. Cl.
CPC ......... *G08G 5/0069* (2013.01); *B64C 39/024* (2013.01); *B64D 47/08* (2013.01); *G01C 11/02* (2013.01); *G01C 21/00* (2013.01); *G05D 1/0094* (2013.01); *G08G 5/0034* (2013.01); *G08G 5/0039* (2013.01); *B64C 2201/027* (2013.01); *B64C 2201/108* (2013.01); *B64C 2201/127* (2013.01); *B64C 2201/141* (2013.01)

(58) Field of Classification Search
CPC ........ B64D 47/08; G01C 11/02; G01C 21/00
See application file for complete search history.

(56) References Cited

U.S. PATENT DOCUMENTS

| | | | | |
|---|---|---|---|---|
| 9,928,748 | B2* | 3/2018 | Chan | G08G 5/0013 |
| 10,049,589 | B1* | 8/2018 | Boyd | B64C 39/024 |
| 10,121,117 | B1* | 11/2018 | Boyd | G08G 5/0013 |
| 10,322,804 | B2* | 6/2019 | Maekawa | B64D 47/08 |
| 2015/0210388 | A1* | 7/2015 | Criado | B64C 39/10 |
| | | | | 701/3 |

(Continued)

*Primary Examiner* — Peter D Nolan
*Assistant Examiner* — Ce Li Li
(74) *Attorney, Agent, or Firm* — Young Basile Hanlon & MacFarlane, P.C.

(57) ABSTRACT

Methods, systems and apparatus, including computer programs encoded on computer storage media for unmanned aerial vehicle flight operations near physical structures or objects. In particular, a point cloud of the physical structure is generated using aerial images of the structure. The point cloud is then referenced to determine a flight path for the UAV to follow around the physical structure, determine whether a planned flight path to desired locations around the structure is possible, determine the fastest route to return home and land from a given position around the physical structure, determine possibility of inflight collision to surface represented in point cloud, or determine an orientation of a fixed or gimbaled camera given a position of the UAV relative the point cloud.

21 Claims, 15 Drawing Sheets

(56) References Cited

U.S. PATENT DOCUMENTS

| | | | |
|---|---|---|---|
| 2016/0371984 A1* | 12/2016 | Macfarlane | G08G 5/0034 |
| 2017/0076438 A1* | 3/2017 | Kottenstette | G06K 9/627 |
| 2017/0110014 A1* | 4/2017 | Teng | G08G 5/0086 |
| 2017/0248969 A1* | 8/2017 | Ham | G01S 17/89 |
| 2018/0109767 A1* | 4/2018 | Li | G05D 1/0038 |

* cited by examiner

UNMANNED AERIAL VEHICLE VISUAL POINT CLOUD NAVIGATION

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned Aerial Vehicles (UAVs) can be navigated about geographic areas to obtain aerial images of persons (e.g., UAVs can follow movements of persons), structures, such as rooftops of houses or commercial buildings, and so on. While navigating, collisions with structures are a constant source of concern, and UAVs may include sensors to help reduce a likelihood of collision. For example, distance sensors can be utilized by UAVs, such as onboard LiDar or LeddAR. These distance sensors can alert a UAV to an approaching structure or physical object, and the UAV can stop moving along a same direction or take evasive action in response. While use of distance sensors can reduce a likelihood of collision, it can only help with respect to immediately approaching structures or objects.

SUMMARY

Particular embodiments of the subject matter described in this specification can be implemented so as to realize one or more of the following advantages. A three-dimensional representation of a particular geographic area, for instance an area that includes a structure to be inspected by an unmanned aerial vehicle (UAV), can be obtained and utilized to inform determinations of flight plans to autonomously perform the inspection. As will be described, a UAV can perform an initial flight plan of the geographic area, obtain images of the structure during the flight plan, and a point cloud of the structure (e.g., an outline of the structure) can be generated based on the obtained images. Utilizing the point cloud, which can include a collection of points each assigned a latitude, longitude, altitude, a system can determine whether waypoints (e.g., user selected waypoints) are too close to the structure such that a collision may result. As an example, error can be inherent in (1) generation of a point cloud (e.g., points in the point cloud may not be exactly at their location in the real world), (2) a navigating UAV's ability to determine its precise location (e.g., a global navigation satellite system 'GNSS' can determine its location accurately to within a particular threshold distance), along with the ability of a UAV to precisely move (e.g., a UAV may be unable to guarantee it can routinely make small adjustments to its position, for instance due to wind or its method of movement). Therefore, when a UAV navigates according to a flight plan, a waypoint too close to the structure (e.g., a waypoint at which the UAV is to obtain images of the structure) may cause the UAV to collide with the structure.

Utilizing point cloud based navigation described herein, a system can better inform whether a flight plan will be successful and not result in a collision. As an example, the system can ensure that a flight plan, before being provided to a UAV, will result in a successful outcome. Utilizing the point cloud, the system can simulate whether a UAV may collide with a structure, for instance the system can determine a confidence associated with the UAV not colliding. Based on the error associated with the point cloud, and errors in movement and location determined by a UAV, the system can assign a buffer to the UAV and a buffer to the structure to be inspected. The buffer, as will be described, can represent a volume of space associated with an uncertainty in the structures position (e.g., an uncertainty in a height of a building) and the UAV's position. That is, a buffer associated with a UAV can indicate that the UAV is likely (e.g., greater than a threshold confidence) located within the buffer. Therefore, the system can determine whether these buffers may overlap during a flight plan, and can inform a user of the unfeasibility of the flight. Additionally, the system can present a modified flight plan to correct an unfeasible flight plan. As an example, the system may change a location of a waypoint, remove a waypoint, and so on.

In this way, the system solves technical problems arising out of use of unmanned aerial vehicles. For example, current systems for generating flight plans are unable to map out flight plans, determine likelihoods of collisions, and so on. That is, current systems rely on UAVs to actively determine whether upcoming collisions can occur, which is an inelegant and, for some applications of UAVs, dangerous proposition. As an example, a UAV inspecting a nuclear power plant may find itself damaged if it navigates too close to a heat leak in a cooling tower. The techniques described herein further reduce a complexity associated with flight plan generation. For example, a same UAV that obtains images for generation of a point cloud can be used to then immediately perform an inspection based flight plan.

The process described below uses an Unmanned Aerial Vehicle to obtain multiple aerial images of a physical structure. The images can then be processed using photogrammetry software to generate a point cloud representing the physical structure. The images may be processed by an onboard UAV computer system, by a ground control station (GCS) used for controlling the UAV, or the images may be submitted from the UAV or from the GCS to another computing system to generate a point cloud. The point cloud may be utilized to determine a flight path for the UAV to autonomously follow around the physical structure. The point cloud may also be utilized to determine whether a planned flight path to desired locations around the structure is possible. For example, a particular waypoint included in a flight plan may be too close to the structure. Additionally, while a UAV is in flight, a fastest route to return home and land from a given position around the physical structure can be determined based on the point cloud. The point cloud can be further utilized to determine possibility of inflight collisions to a surface of the structure as represented in the point cloud, and to determine an orientation of a fixed or gimbaled camera given a position of the UAV relative the point cloud.

In general, one innovative aspect of the subject matter described in this specification can be embodied in a system, computer readable media and methods that include the actions of obtaining geo-spatial readings of the UAV that was placed on a ground control point marker, storing the geo-spatial readings in a non-volatile memory, conducting by the UAV an aerial survey of the structure thereby generating one or more images including a portion of the structure, and one or more images including a representation of the ground control point marker, and generating a 3-dimensional point cloud using the one or more images of the structure and of the ground control point marker.

In general, another innovative aspect of the subject matter described in this specification can be embodied in a system, computer readable media and methods that include the actions of obtaining a point cloud representing a physical structure, receiving one or more inspection locations about the physical structure for inspection, determining a flight path for an unmanned aerial vehicle (UAV) for each inspection location in reference to the point cloud, navigating the UAV according to the determined flight path, and obtaining aerial images by the UAV of the inspection locations.

In general, another innovative aspect of the subject matter described in this specification can be embodied in a system, computer readable media and methods that include the actions of obtaining a point cloud representing a physical structure, navigating the UAV above the physical structure, obtaining by the UAV a geo-spatial location of the UAV, determining the occurrence of a contingency event, calculating a contingency landing zone based in reference to the point cloud, and navigating the UAV to the contingency landing zone.

In general, another innovative aspect of the subject matter described in this specification can be embodied in a system, computer readable media and methods that include the actions of obtaining a point cloud representing a physical structure, and navigating an unmanned aerial vehicle (UAV) above the physical structure, and obtaining by the UAV a geo-spatial location of the UAV, determining a flight vehicle buffer for the UAV, determining a point cloud buffer for the point cloud, and determining an actual or potential collision by the UAV to a surface of the physical structure.

In general, another innovative aspect of the subject matter described in this specification can be embodied in a system, computer readable media and methods that include the actions of obtaining a point cloud representing a physical structure, navigating an unmanned aerial vehicle (UAV) above the physical structure, obtaining by the UAV a geo-spatial location of the UAV, determining a slope of a surface of the physical structure for an area of interest, using the point cloud, determining a position of the UAV relative to the area of interest, and orienting a gimbaled camera of the UAV to a desired angle relative to the slope of the area of interest.

DETAILED DESCRIPTION

Figure 1:
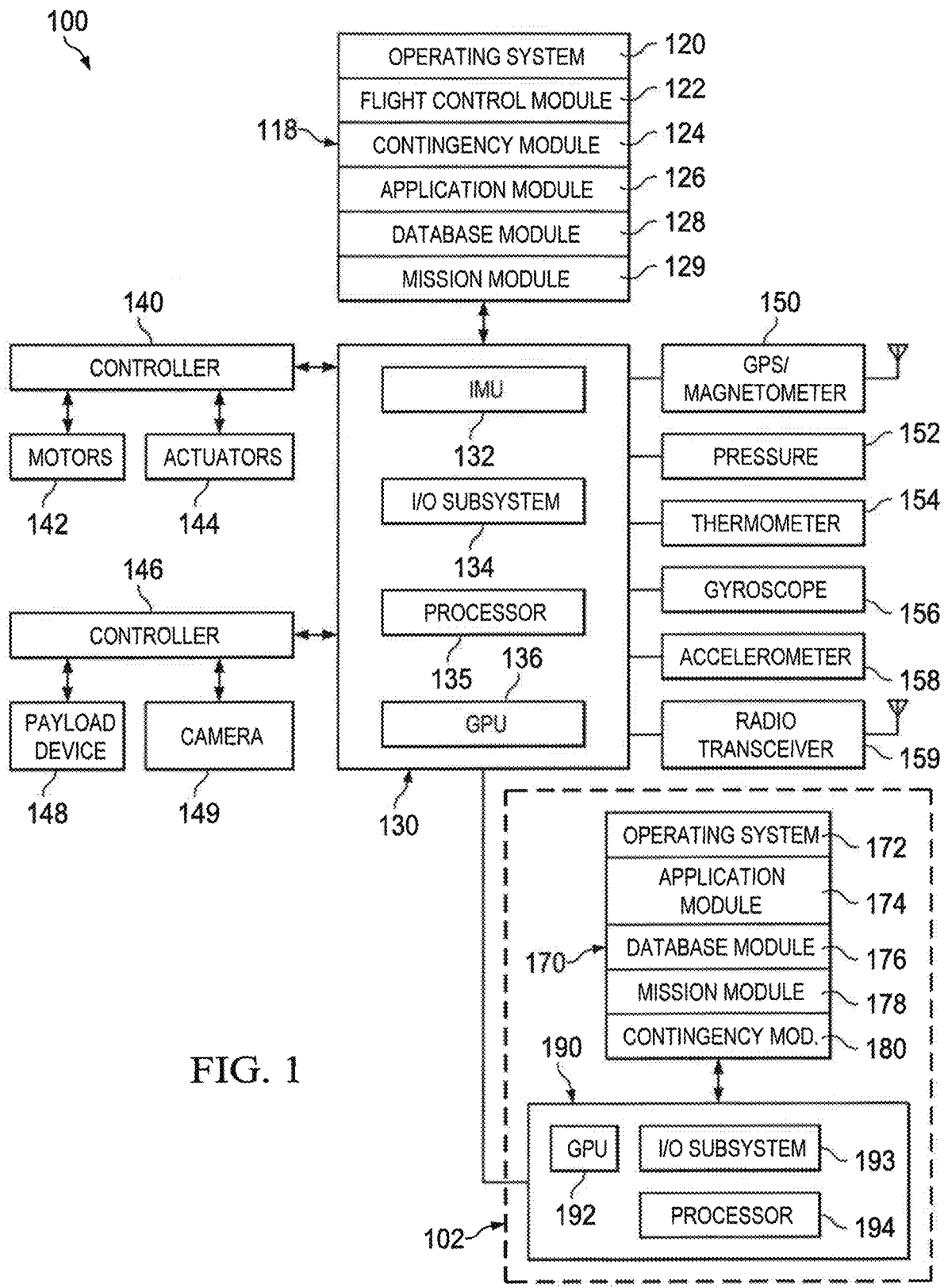
FIG. 1 is a block diagram of an example flight control system architecture for an unmanned aerial vehicle (UAV).

This specification describes generating point clouds of structures, and utilizing the generated point clouds to (1) inform determination of an unmanned aerial vehicle (UAV) flight plan to inspect a structure, and/or to (2) enable the UAV, while navigating, to reduce a likelihood of a collision with the structure or other objects. As will be described, an initial flight plan can be performed by a UAV, with the initial flight plan causing the UAV to obtain images of a particular geographic area. The geographic area can include a structure, such as a house, building, power plant, vertical structure (e.g., cell tower, transmission tower), and so on, that is to be inspected by a UAV. For example, the UAV can inspect the structure for damage, and can navigate about the structure capturing images of the structure via one or more cameras, sensors, and so on, accessible to the UAV. Upon completion of the initial flight plan, the images can be obtained by a system and a three-dimensional representation of the geographic area can be generated. For example, a ground control system (hereinafter referred to as a GCS), which can be a user device utilized by an operator located proximate to the initial flight plan, or a system in communication with the UAV or GCS via a network, can generate the three-dimensional representation. As will be described, the system can include a flight planning system or a cloud system, and the system can be in communication with the UAV or GCS via a network (e.g., the internet, for instance via a wireless connection). An example three-dimensional representation can include a point cloud, with included points being associated with locations in three-dimensional space.

After generation of the point cloud, a system (e.g., a flight planning system, a cloud system, a GCS) can receive user input describing a flight plan. Examples of describing a flight plan are included in U.S. patent application Ser. No. 15/042,798 titled "UNMANNED AERIAL VEHICLE REMOTE FLIGHT PLANNING SYSTEM," which is hereby incorporated by reference in its entirety for all purposes. User input describing a flight plan can include a user specifying particular waypoints at which a UAV is to perform particular actions. As an example, a waypoint can be located at a particular position relative to the structure, and particular actions can include the UAV descending from a navigation altitude, obtaining images or sensor information of the structure while vertically descending, and ascending back to the navigation altitude upon reaching a particular lowest altitude. Other flights plan can be generated, for example a particular flight pattern can be generated by a user (e.g., the user can trace his/her finger on a touch sensitive screen sketching out a flight pattern, or the user can define points along the flight pattern, and a continuous pattern can be determined), and the user can indicate actions for a UAV to perform along the flight pattern.

The system can utilize the generated point cloud to inform whether a described flight plan is feasible to be performed by a UAV. For example, a flight plan being feasible can include the UAV avoiding a collision with the structure being inspected or any object (e.g., a tree, car, and so on) included in the geographic area. As described above, the generated point cloud includes points associated with three-dimensional locations. For example, each point can be assigned a latitude, longitude, altitude, with respect to the real-world (e.g., with respect to the World Geodetic System). Thus, a size of the structure can be determined, a contour of the structure, and so on, such that the system can determine whether a described flight plan may collide with the structure or with objects.

In determining feasibility, the system can determine a buffer to surround the structure and/or objects, with the buffer indicating uncertainty associated with an absolute size of the structure and/or objects. For example, when generating the point cloud, the images obtained in the initial flight plan are associated with (e.g., tagged with) GNSS coordinates of the UAV, optionally along with altitude information (e.g., the UAV can have a barometer, lidar sensor, sonar sensor) and/or information describing a field of view of a camera used to obtain the images (e.g., a camera pose). The GNSS coordinates may not be precisely accurate, such that precise locations of the UAV may be unable to be determined. While, as will be described, techniques can be utilized to limit an extent of the error (e.g., a ground control point marker, described in FIGS. 4-5), the resulting point cloud may still have error. For example, the error can be associated with particular points (e.g., the error, such as positional error, may be different for points in the point cloud) and/or associated with the point cloud (e.g., the structure may be entirely shifted along a lateral direction). Therefore, the buffer can indicate an uncertainty associated with respective sources of error. The system can assign a particular buffer to be included on an outside (e.g., contour) of the structure and objects included in the point cloud. An example buffer can be 1 meter, 2 meters, 5 meters, from a surface of the structure and objects as indicated in the point cloud.

Figure 13:
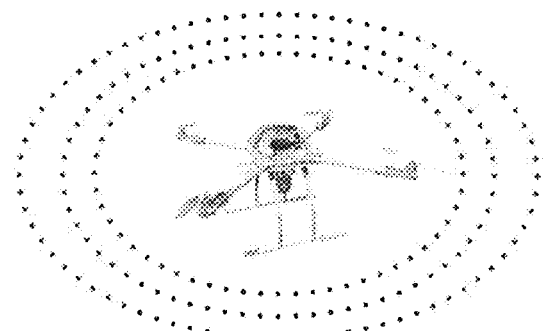
FIGS. 13A-E illustrates exemplary vehicle flight buffers.
Figure 13:
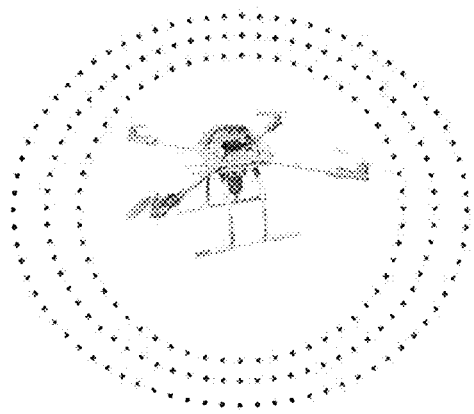
Figure 13:
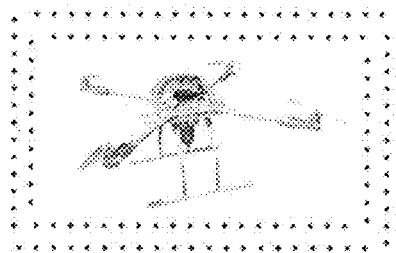
Figure 13:
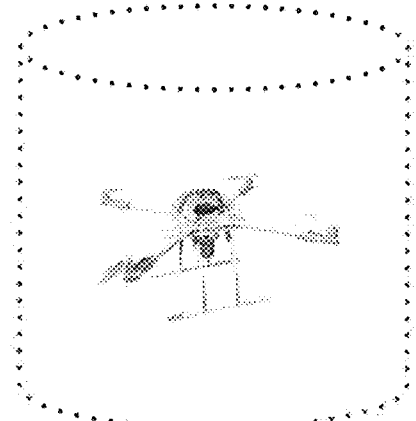
Figure 13:
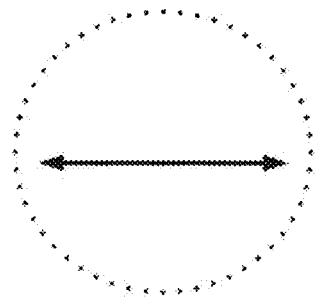

Similarly, the system can determine a buffer to surround the UAV, with the buffer indicating uncertainty with respect to location of the UAV and/or the UAV's ability to smoothly move along a flight plan and make fine adjustments of its position. As an example, while navigating the UAV may, at least in part, rely on a GNSS receiver. The GNSS receiver may have associated error in determining its true (e.g., accurate) position in three-dimensional space. For example, the GNSS receiver may be able to accurate determine its location to within a threshold degree (e.g., 50 centimeters, 1 meter, 3 meters). Additionally, the error associated with the GNSS can fluctuate as GNSS satellites come into, and leave, view of the UAV. Therefore, the system can determine an error associated with the GNSS receiver. Additionally, the system can determine an error associated with the UAV's movement ability. For example, particular UAVs may be able to modify their courses (e.g., ascend, move laterally) and move a first threshold distance (e.g., 10 centimeters, 20 centimeters), while other UAVs may be able to move a second threshold distance (e.g., 50 centimeters, 1 meter). That is, an ability of the UAV to precisely control movement can be variable according to a type of the UAV (e.g., configuration information of the UAV, such as rotors, motors, structure of the UAV, and so on). Therefore, a UAV may be unable to follow a particularly precise flight plan, such as a flight plan that positions the UAV at a close distance from a variable surface of a structure. The system can determine the buffer surrounding the UAV based on these sources of error. Examples of buffers are illustrated in FIG. 13, and a shape associated with the buffer can be spherical, or rectangular, or an ellipsoid. As an example, the system may have a greater confidence in the UAV's position along a first direction (e.g., a lateral direction) than along a second direction (e.g., a longitudinal direction). For instance, FIG. B of FIG. 13 illustrates a buffer that is larger below the UAV than it is to the sides of the UAV. For this example buffer, the system has determined a greater uncertainty associated with the UAV's altitude than the UAV's lateral position.

Utilizing the error sources the system can determine whether flight plans may result in a collision by a UAV with the structure or objects. For example, the system can determine whether the UAV's buffer will overlap with the structure's buffer while performing a flight plan. Upon a positive determination, the system can present information to a user of the system indicating that the flight plan is infeasible. Additionally, the system can modify the flight plan such that a collision will not occur. For example, the system can modify a particular waypoint to be located at a greater altitude, or the system can modify the particular waypoint to be located at an angle from the particular waypoint. In this way, the UAV may be able to obtain an image at a closest orthonormal position from the particular waypoint (e.g., the image may include lesser detail, or optionally a camera of the UAV can increase a focal length of a lens to maintain detail), or obtain the image at an angular offset.

As will be described, flight plans for inspecting structure may be based on a ground sampling distance (GSD) identifying a particular minimum level of detail to be included in images of the structure. As an example, a GSD can specify a particular number of a pixels per distance, pixels per distance area, and so on. The GSD can be utilized to inform a distance from a structure being imaged, such that the images will include a minimum level of detail from the structure. Therefore, when determining whether a UAV may collide with a structure, the system can determine whether the UAV, while navigating at an altitude informed by a specified GSD, may collide with the structure.

While the description above described, in parts, that a buffer is determined for the structure, objects, UAV, and so on, the buffer can be more complex and be associated with a statistical confidence at distances from the structure, objects, or UAV. As an example, a buffer for a structure can indicate that at a first distance from the structure (e.g., 5 meters), the confidence that the actual (e.g., true) height of the structure is less than the first distance can be a particular confidence (e.g., 95%, 99%). In contrast, the buffer can indicate that at a second distance from the structure (e.g., 50 centimeters), the confidence that the actual height of the structure is less than the second distance can be a different confidence (e.g., 20%, 40%, 60%). Therefore, the system can determine a flight plan as being unfeasible if a likelihood of a collision is greater than a threshold percent (e.g., 75%, 80%, 85%). Similarly, the system can determine a confidence that two locations are separated (e.g., a top of a structure, a bottom of a UAV while descending), and can allow a flight plan upon determining that the confidence is greater than a threshold (e.g., 75%, 80%, 85%).

As will be described, upon generation of a flight plan, a UAV can navigate (e.g., autonomously) navigate according to the flight plan, and can utilize the generated point cloud during navigation. As an example, the UAV may be able to modify a speed at which it moves based on a confidence that the UAV will not collide with an object or structure. For example, as the UAV descends from a particular altitude towards a surface of a rooftop, the UAV can reduce its speed as the confidence in there not being a collision reduces. As another example, the UAV can utilize, at least in part, the point cloud to determine a slope of a roof, as described below with respect to FIG. 14. The determined slope can be utilized to modify a gimbal associated with a camera, such that images can of the structure can be obtained from a normal (e.g., perpendicular) field of view. The UAV can also utilize the point cloud during navigation to rapidly find a closest landing area, and a fastest flight pattern to the landing area, for instance upon detecting a contingency condition. For example, in contrast to current systems in which the UAV may be required to follow pre-determined flight patterns from present locations to landing areas, the UAV can utilize the point cloud to inform a faster flight pattern. That is, current systems can cause the UAV to ascend to a particular altitude (e.g., a safe altitude, above which the UAV can freely navigate within a particular geofence— described below), navigate at the particular altitude to a position above a landing area, and descend. This can create problems if the UAV needs to quickly land, for example due to low battery life, and the UAV is required to rapidly ascend which can quickly eliminate remaining battery life. Therefore, the UAV can utilize the point cloud to determine objects, structures, in a path to the landing area, and may be able to simply move laterally and descend to the landing area.

In this specification unmanned aerial vehicles include drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload modules (e.g., any hardware, software, module, and so on, that is not critical to the flight operation of the UAV), can include any device that captures real-world information, including cameras, radiation measuring instruments, distance detectors such as Lidar, and so on.

FIG. 1 is a block diagram of an example Unmanned Aerial Vehicle (UAV) architecture for implementing the features and processes described herein. A UAV can include a primary computer system 100 and a secondary computer system 102. The UAV primary computer system 100 can be a system of one or more computers, or software executing on a system of one or more computers, which is in communication with, or maintains, one or more databases. The UAV primary computer system 100 can include a processing subsystem 130 including one or more processors 135, graphics processing units 136, I/O subsystem 134, and an inertial measurement unit (IMU) 132. In addition, the UAV primary computer system 100 can include logic circuits, analog circuits, associated volatile and/or non-volatile memory, associated input/output data ports, power ports, etc., and include one or more software processes executing on one or more processors or computers. The UAV primary computer system 100 can include memory 118. Memory 118 may include non-volatile memory, such as one or more magnetic disk storage devices, solid-state hard drives, or flash memory. Other volatile memory such a RAM, DRAM, SRAM may be used for temporary storage of data while the UAV is operational. Databases may store information describing UAV flight operations, flight plans, contingency events, geofence information, component information and other information.

The UAV primary computer system 100 may be coupled to one or more sensors, such as GNSS receivers 150 (e.g., GPS receivers), thermometer 154, gyroscopes 156, accelerometers 158, pressure sensors (static or differential) 152, current sensors, voltage sensors, magnetometers, hydrometers, and motor sensors. The UAV may use IMU 132 in inertial navigation of the UAV. Sensors can be coupled to the UAV primary computer system 100, or to controller boards coupled to the UAV primary computer system 100. One or more communication buses, such as a controller area network (CAN) bus, or signal lines, may couple the various sensor and components.

Various sensors, devices, firmware and other systems may be interconnected to support multiple functions and operations of the UAV. For example, the UAV primary computer system 100 may use various sensors to determine the UAV's current geo-spatial position, attitude, altitude, velocity, direction, pitch, roll, yaw and/or airspeed and to pilot the UAV along a specified flight path and/or to a specified location and/or to control the UAV's attitude, velocity, altitude, and/or airspeed (optionally even when not navigating the UAV along a specific flight path or to a specific location).

The flight control module 122 handles flight control operations of the UAV. The module interacts with one or more controllers 140 that control operation of motors 142 and/or actuators 144. For example, the motors may be used for rotation of propellers, and the actuators may be used for flight surface control such as ailerons, rudders, flaps, landing gear and parachute deployment.

The contingency module 124 monitors and handles contingency events. For example, the contingency module 124 may detect that the UAV has crossed a boundary of a geofence, and then instruct the flight control module 122 to return to a predetermined landing location. The contingency module 124 may detect that the UAV has flown or is flying out of a visual line of sight (VLOS) from a ground operator, and instruct the flight control module 122 to perform a contingency action, e.g., to land at a landing location. Other contingency criteria may be the detection of a low battery or fuel state, a malfunction of an onboard sensor or motor, or a deviation from the flight plan. The foregoing is not meant to be limiting, as other contingency events may be detected. In some instances, if equipped on the UAV, a parachute may be deployed if the motors or actuators fail.

The mission module 129 processes the flight plan, waypoints, and other associated information with the flight plan as provided to the UAV in a flight package. The mission module 129 works in conjunction with the flight control module 122. For example, the mission module may send information concerning the flight plan to the flight control module 122, for example waypoints (e.g., latitude, longitude and altitude), flight velocity, so that the flight control module 122 can autopilot the UAV.

The UAV may have various devices connected to the UAV for performing a variety of tasks, such as data collection. For example, the UAV may carry a camera 149, which can be, for example, a still image camera, a video camera, an infrared camera, or a multispectral camera. In addition, the UAV may carry a Lidar, radio transceiver, sonar, and traffic collision avoidance system (TCAS). Data collected by the devices may be stored on the device collecting the data, or the data may be stored on non-volatile memory 118 of the UAV primary computer system 100.

The UAV primary computer system 100 may be coupled to various radios, e.g., transceivers 159 for manual control of the UAV, and for wireless or wired data transmission to and from the UAV primary computer system 100, and optionally a UAV secondary computer system 102. The UAV may use one or more communications subsystems, such as a wireless communication or wired subsystem, to facilitate communication to and from the UAV. Wireless communication subsystems may include radio transceivers, infrared, optical ultrasonic and electromagnetic devices. Wired communication systems may include ports such as Ethernet ports, USB ports, serial ports, or other types of port to establish a wired connection to the UAV with other devices, such as a ground control station (GCS), flight planning system (FPS), cloud system, or other devices, for example a mobile phone, tablet, personal computer, display monitor, other network-enabled devices. The UAV may use a lightweight tethered wire to a GCS for communication with the UAV. The tethered wire may be affixed to the UAV, for example via a magnetic coupler.

Flight data logs may be generated by reading various information from the UAV sensors and operating system 120 and storing the information in computer-readable media (e.g., non-volatile memory 118). The data logs may include a combination of various data, such as time, altitude, heading, ambient temperature, processor temperatures, pressure, battery level, fuel level, absolute or relative position, position coordinates (e.g., GPS coordinates), pitch, roll, yaw, ground speed, humidity level, velocity, acceleration, and contingency information. This foregoing is not meant to be limiting, and other data may be captured and stored in the flight data logs. The flight data logs may be stored on a removable medium. The medium can be installed on the ground control system or onboard the UAV. The data logs may be wirelessly transmitted to the ground control system or to the FPS.

Modules, programs or instructions for performing flight operations, contingency maneuvers, and other functions may be performed with operating system 120. In some implementations, the operating system 120 can be a real-time operating system (RTOS), UNIX, LINUX, OS X, WINDOWS, ANDROID, or another operating system 120. Additionally, other software modules and applications may run on the operating system 120, such as a flight control module 122, contingency module 124, application module 126, database module 128 and mission module 129. Typically, flight critical functions will be performed using the UAV primary computer system 100. Operating system 120 may include instructions for handling basic system services and for performing hardware dependent tasks.

In addition to the UAV primary computer system 100, the secondary computer system 102 may be used to run another operating system 172 to perform other functions. The UAV secondary computer system 102 can be a system of one or more computers, or software executing on a system of one or more computers, which is in communication with, or maintains, one or more databases. The UAV secondary computer system 102 can include a processing subsystem 190 of one or more processors 194, GPU 192, and I/O subsystem 193. The UAV secondary computer system 102 can include logic circuits, analog circuits, associated volatile and/or non-volatile memory, associated input/output data ports, power ports, etc., and include one or more software processes executing on one or more processors or computers. The UAV secondary computer system 102 can include memory 170. Memory 170 may include non-volatile memory, such as one or more magnetic disk storage devices, solid-state hard drives, flash memory. Other volatile memory such a RAM, DRAM, SRAM may be used for storage of data while the UAV is operational.

Ideally, modules, applications and other functions running on the secondary computer system 102 will be non-critical functions in nature. If the function fails, the UAV will still be able to safely operate. The UAV secondary computer system 102 can include operating system 172. In some implementations, the operating system 172 can be based on real time operating system (RTOS), UNIX, LINUX, OS X, WINDOWS, ANDROID or another operating system. Additionally, other software modules and applications may run on the operating system 172, such as an application module 174, database module 176, mission module 178 and contingency module 180. Operating system 172 may include instructions for handling basic system services and for performing hardware dependent tasks.

The UAV can include controllers 146. Controllers 146 may be used to interact with and operate a payload device 148, and other devices such as camera 149. Camera 149 can include a still-image camera, video camera, infrared camera, multispectral camera, stereo camera pair. In addition, controllers 146 may interact with a Lidar, radio transceiver, sonar, laser ranger, altimeter, TCAS, ADS-B (Automatic dependent surveillance—broadcast) transponder. Optionally, the secondary computer system 102 may have controllers to control payload devices.

Figure 2:
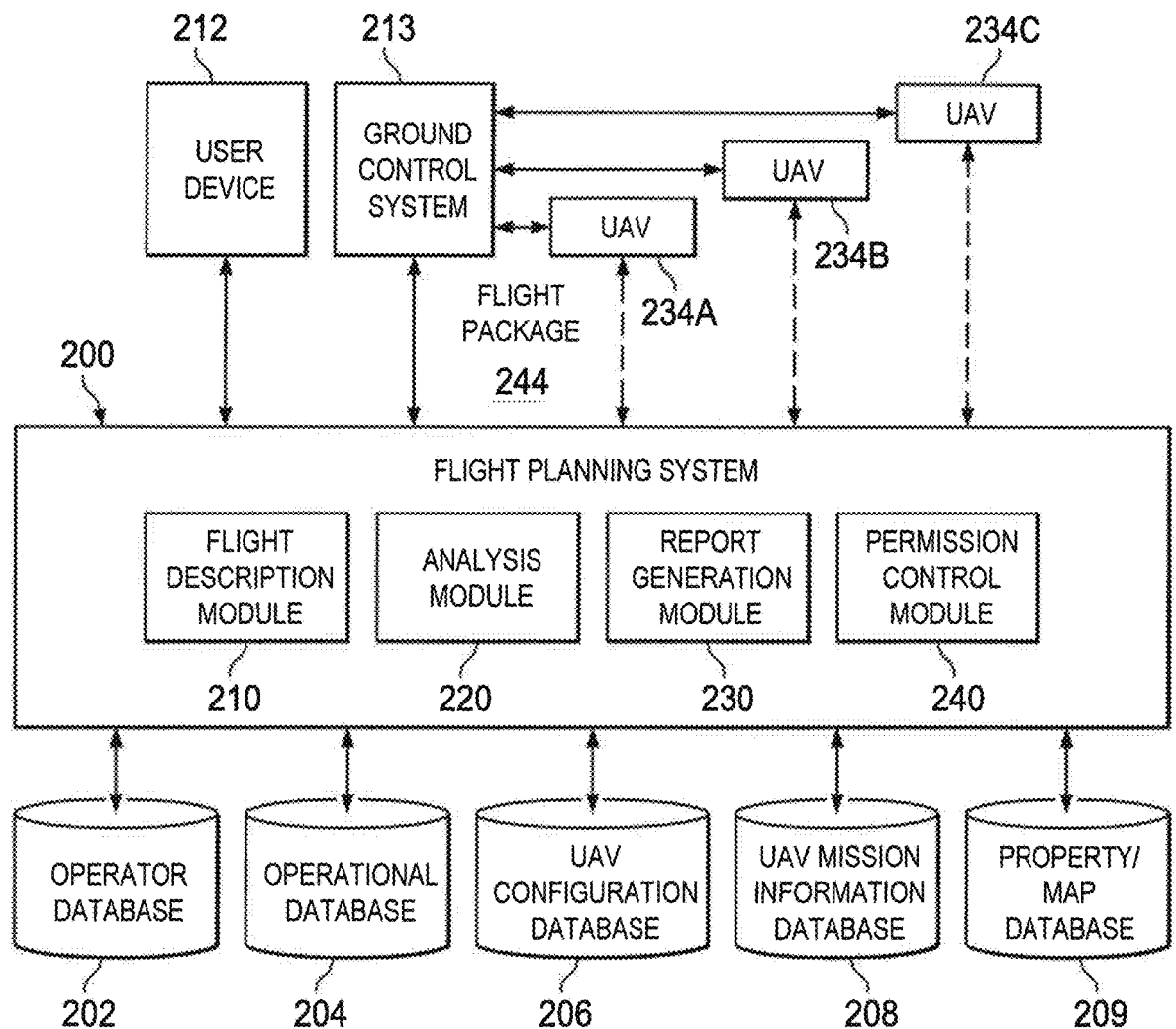
FIG. 2 is a block diagram illustrating an example flight planning system.

FIG. 2 is a block diagram illustrating an example flight planning system (FPS) 200. The various illustrated components may communicate over wired and/or wireless communication channels (e.g., networks, peripheral buses, etc.). FPS 200 can be a system of one or more computer processors, or software executing on a system of one or more computers. The FPS 200 can maintain and communicate with one or more databases (e.g., databases 202-209) storing information describing prior implemented flight plans and information associated with each flight plan (e.g., information describing a UAV, an operator, property/map, mission, database, and so on). The databases can include operator database 202, operational database 204, UAV configuration database 206, UAV mission information database 208 and property and map database 209.

The FPS 200 can be a system of one or more processors, graphics processors, logic circuits, analog circuits, associated volatile and/or non-volatile memory, associated input/output data ports, power ports, etc., and include one or more software processes executing on one or more processors or computers. The FPS 200 can be a component of, or be coupled to, one or more user devices 212 or a ground control system (GCS) 213. A user device 212 can be a device including one or more processors and configured to send data to and receive data from one or more UAVs 234A, 234B and 234C. A GCS 213 can be a specialized user device 212 configured to control one or more aspects of a flight of UAVs 234A, 234B and 234C.

The FPS 200 may store, and maintain, flight operation information associated with a UAV. Flight operation information may include configuration information of each UAV, flight mission and planned flight path, operator information, the UAV's precise three-dimensional (3D) location in space, velocity information, UAV status (e.g., health of components included in the UAV), contingency plans, and so on. The FPS 200 can receive (e.g., from an operator), and determine, information describing a flight plan. The FPS 200 can provide a flight package 244 associated with the flight plan to a UAV (e.g., UAV 234A, 234B, 234C) to implement. Additionally, the FPS 200 can store flight plan information, flight data log information, job information in the various databases.

The example FPS 200 includes a flight description module 210 that can generate interactive user interfaces (e.g., HTML or XML content for web pages) for rendering on a user device (e.g., user device 212). The interactive user interfaces may optionally be transmitted for display to the user device via a wireless network or another communication channel. User device 212 can receive, from an operator, information describing a flight plan to be performed (e.g., by UAV 234A, 234B, or 234C).

To describe one or more locations where the flight plan is to be conducted, a user interface may be configured to receive, from an operator, location information associated with the flight plan (e.g., an address of a home or property, geospatial coordinates of a structure to be inspected, and so on). The flight description module 210 can obtain information describing the location. For instance, the information can include property boundaries associated with an address (e.g., boundaries of a home, obtained from a database, or system that stores or configured to access property boundary information), obstacles associated with the location (e.g., nearby trees, electrical towers, telephone poles) and/or other information. Additionally, the flight description module 210 can obtain imagery, such as geo-rectified imagery (e.g., satellite imagery), associated with the entered location information. The flight description module 210 can include some or all of the information describing the location (e.g., the obtained imagery or boundary information) in an interactive user interface to be presented on the user device 212 to an operator.

The operator of the user device 212 may interact with user interfaces to describe a flight boundary geofence (as described further below) for a UAV to enforce. For instance, the user device 212 can receive imagery associated with operator-entered location information, and present one or more geofence shapes layered on the imagery. The user interface provides functionality for the operator to select a presented shape (e.g., a polygon), and further provides functionality enabling the operator to drag and/or drop the shape to surround an area of interest in the received imagery to limit allowable locations of a UAV to locations within the shape. Optionally, the user interface may allow the user device 212 to receive input (e.g., of a finger or stylus) tracing a particular shape onto a touch-screen display of the user device 212. The flight description module 210 can store information describing the trace as a flight boundary geofence. Accordingly, the user device 212 can provide information describing the traced shape to the flight description module 210 (e.g., coordinates associated with the imagery). The flight description module 210 can correlate the traced shape to location information in the real world as illustrated by the imagery (e.g., geospatial coordinates that correspond to the traced shape).

Similarly, a user interface can enable the operator to describe safe locations for a UAV to begin the flight plan (e.g., a launching location where the UAV takes off from the ground) and end the flight plan (e.g., a landing location where the UAV lands). As an example, the flight description module 210 can analyze the obtained imagery associated with the entered location information, and identify a geometric center of a convex area (e.g., a biggest convex area) within the geofence boundary that does not include obstructions (e.g., trees). For example, the flight description module 210 can determine an open area, such as an open pasture. Similarly, the flight description module 210 can obtain topographical information associated with the entered location information, and can detect substantially flat areas (e.g., areas with less than a threshold of variance in height). For instance, the flight description module 210 can determine that an open space (e.g., an open clearing that is substantially flat) is a safe launching location for the UAV to take-off from, and can provide information recommending the open space in an interactive user interface presented on the user device 212. Additionally, the flight description module 210 can analyze the obtained imagery and locate physical features that are generally known to be safe locations for take-off and landing. For example, the flight description module 210 can determine that a driveway of a home associated with the flight plan is a safe, and can select the driveway as a safe launching and landing location, or can recommend the driveway as a safe launching and landing location.

The flight description module 210 can receive (e.g., from a user interface) survey or flight mission information via a flight package, for instance information indicating a particular type of survey for a UAV to perform (e.g., damage inspection, inspection of a vertical structure, or inspection of a rooftop). The flight description module 210 can receive waypoints for the UAV to travel to, including an order in which the waypoints are to be traveled to, a ranking or importance of each, or a group of, waypoints, and specific actions for the UAV to take while traveling to, or after reaching, each waypoint. For instance, a user interface can optionally enable the operator using the user device 212 to specify that upon reaching a particular waypoint, the UAV is to activate a particular sensor, or other payload devices, such as an infra-red camera, a sensor measuring radiation, and so on. Additionally, a user interface can optionally enable the operator to specify transition speeds the UAV is to use when travelling between waypoints, or between particular waypoints.

In addition to the navigation of the UAV to the waypoints, operations to be performed at a particular location, or waypoint, may be identified by an operator using the FPS 200 or GCS 213 via a user interface. The user interface can allow an operator to photographically inspect a specified location. Operations of the UAV may be automatically configured by either the FPS 200 or GCS 213 depending on the type of inspection to be performed.

The flight description module 210 can receive information describing, or relevant to, configuration information of a UAV, such as a type of UAV (e.g., fixed-wing, single rotor, multi-rotor, and so on). In addition, the flight description module 210 can receive information describing, or relevant to, configuration information of sensors or other payload devices required for the survey or flight mission information, and general functionality to be performed. The flight description module 210 can then determine recommendations of particular UAVs (e.g., UAVs available to perform the flight plan) that comport with the received information. Similarly, the flight description module 210 can determine that, based on the received survey type, a UAV will require particular configuration information, and recommend the configuration information to the operator. For instance, the flight description module 210 can receive information identifying that hail damage is expected, or is to be looked for, and can determine that a UAV that includes particular sensors, and specific visual classifiers to identify hail damage, is needed. For example, the flight description module 210 can determine that a heat and/or thermal imaging sensor that includes specific visual classifiers that can distinguish hail damage from other types of damage (e.g., wind damage, rain damage, and so on) is needed.

The flight description module 210 can utilize received survey or flight mission information to determine a flight pattern for a UAV to follow. For instance, the flight description module 210 can determine a path for the UAV to follow between each waypoint (e.g., ensuring that the UAV remains in the geofence boundary). Additionally, the flight description module 210 can determine, or receive information indicating a safe minimum altitude for the UAV to enforce, the safe minimum altitude being an altitude at which the UAV is safe to travel between waypoints. The safe minimum altitude can be an altitude at which the UAV will not encounter obstacles within the geofence boundary (e.g., a height above buildings, trees, towers, poles and so on). Similarly, the safe minimum altitude can be based on a ground sampling distance (GSD) indicating a minimum resolution that will be required from imagery obtained by the UAV while implementing the flight plan (e.g., based in part on capabilities of an included camera, such as sensor resolution, sensor size, and so on).

The flight description module 210 can receive a time that the flight plan is to be performed (e.g., a particular day, a particular time at a particular day, a range of times, and so on). The flight description module 210 can then determine an availability of UAVs and/or operators at the received time(s). For example, the flight description module 210 can obtain scheduling information. Additionally, the flight description module 210 can filter available UAVs according to determined configuration information (e.g., as described above). Optionally, the flight description module 210 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better imagery by maximizing image contrast and minimizing the effects of shadows). The flight description module 210 can determine the flight plan accordingly.

The FPS 200 can provide the determined flight plan as a flight package 244 directly to a UAV (e.g., the UAV 234A, 234B or 234C). Optionally, the FPS 200 can provide the flight package 244 to a user device 212 or GCS 213. The user device 212 or GCS 213 can modify the flight plan or preserve the flight plan in the flight package 244 as received. The user device 212 or GCS 213 can transmit the flight package 244 to the UAV 234A, 234B or 234C. Optionally, the flight package 244 can include a flight manifest file (e.g., an XML file) identifying necessary application and version information to conduct the flight plan. For instance, the UAV can be required to execute a particular application (e.g., "app" downloaded from an electronic application store) that provides functionality necessary to conduct the flight plan. As an example, an application can effect, such as cause implementation of, a flight plan associated with inspecting vertical structures, and the UAV can be required to execute the application prior to initiation of the flight plan.

In particular, the FPS 200 may create a flight plan for automated or partially automated flight of a UAV, taking into consideration structural data to avoid situations where the UAV may fly out of VLOS of a base location. The base location can include one or more locations of an operator of a UAV. In some implementations, the base location can be a geospatial position of the user device 212 or a launching location of the UAV.

The FPS 200 may receive, via a user interface, a location for an aerial survey to be conducted by an unmanned aerial vehicle. One or more images may be displayed depicting a view of the location. The interface allows for a selection of a launching location of the UAV. As the images have associated geospatial positions, the FPS 200 can determine an associated latitude/longitude for the launching location. The user interface may receive an input or selections for one or more flight waypoints. Similar to the launching locations, the flight waypoints having an associated geospatial position. The FPS 200 may assign altitudes for the flight waypoints, or altitudes for the flight waypoints may be determined by a user, and specific numeric altitudes values may be set.

The FPS 200 may determine based on the launching location and altitude of the one or more flight waypoints whether a flight waypoint may cause a non-VLOS occurrence. From the launching location, a flight plan may be generated using waypoints having an associated latitude and longitude coordinates, and an associated altitude. The FPS 200 may not allow a UAV waypoint where the VLOS from the base location (e.g., the launching location, or an area around the launching location), upon determining that the waypoint would be blocked because of a structure. The FPS 200 may use 3D polygonal data, topographical data or other structure data in generating the flight plan. The system can use a 3D coordinate system to determine, based on a base location and each waypoint location, whether the UAV would likely enter into a non-VLOS situation. The flight planning system 200 can then generate flight plan that avoids the non-VLOS situation, and including only the flight waypoints that would not cause a non-VLOS occurrence.

Additionally, the FPS 200 may determine a geofence boundary to limit flight of the UAV to a bounded area. The user interface may display the geofence boundary over one or more location images. Additionally, the FPS 200 may determine a survey area, and set the survey area within the geofence boundary.

The FPS 200 then receives, from a GCS 213 (or directly from the UAV), flight log data and collected sensor data after the UAV has conducted the flight plan. A user interface of the FPS 200 then displays at least a portion of sensor data collected by the UAV, and information associated with the flight data package.

Similar to the FPS 200, the GCS 213 may also be used for flight and contingency planning. The GCS 213 can receive flight plans from the FPS 200 for transmission to the UAV. The GCS 213 also allows for manual override of a UAV operating in an autopilot mode. A flight plan may be transmitted to the UAV either via a wireless or tethered connection. Ideally, the GCS 213 is a mobile device, such a laptop, mobile phone, tablet device, with a cellular and other wireless connection for data transmission over the Internet or other network.

Each of user device 212, including specialized user device 212 designated as GCS 213, can be a system of one or more computers, or software executing on a system of one or more computers, which is in communication with, or maintains, one or more databases, e.g., databases, storing information describing UAV flight operations and components. Each of user device 212 can be a system of one or more processors, graphics processors, logic circuits, analog circuits, associated volatile and/or non-volatile memory, associated input/output data ports, power ports, etc. Each of user device 212 can include one or more software processes executing on one or more processors or computers.

Although in one embodiment of the invention, the FPS 200 may be primarily used to create and transmit a flight package 244 to a UAV or GCS 213, the UAV or GCS 213 can initiate the request for a flight package 244 from the FPS 200. An operator may take the UAV or GCS 213 to a property location. The UAV or GCS 213 may then request a flight package, or an updated flight package using a current position of the UAV or GCS 213. For example, the UAV or GCS 213 can determine its geospatial position via a GNSS receiver (using GPS, GLONASS, Galileo or Beidou system). The UAV or GCS 213 can then transmit its location to the FPS 200, along with other identifying information about the requesting device, such as its unique identifier (UID), or media access control (MAC) address, etc. The FPS 200 will receive the request, and determine if an updated or changed flight package exists by comparing the device identifier with identifiers in a database storing the new or updated flight package information. If FPS 200 finds a new or updated flight package, then the FPS 200 transmits the flight package from the FPS 200. The UAV or GCS 213 can receive the flight package. A confirmation acknowledging receipt of the flight package may then be transmitted from the UAV or GCS 213 to the FPS 200. The FPS 200 will then update a database record to indicate that the particular flight package has been received. Moreover, the UAV or GCS 213 can supply the property location, and a new job request can be sent to the FPS 200. The FPS 200 may create a new flight package for the UAV or GCS 213.

For autonomous flight of a UAV (UAV 234A, 234B, or 234C), a flight plan may be created and transmitted to the UAV. The flight plan instructs the UAV with regard to a particular flight path. A flight plan may be created using a FPS 200, or a GCS 213. A flight plan instructs the UAV where it should fly in a 3D space. The flight plan includes a series of connected waypoints that define where the UAV should fly and what actions that the UAV should complete during a particular flight. The UAV may have an autopilot flight module operating on a UAV computer system that uses the flight plan to automatically fly the UAV. The flight plan information may be provided to the GCS 213 and then to the UAV or directly to the UAV, in a flight package 244 comprising the flight plan and other information (such as contingency event instructions).

Using the FPS 200, or GCS 213, a UAV operator may select a series of geographically-based waypoints and a launching location for the UAV. Based on the waypoints, a flight plan may be constructed allowing the UAV to autonomously navigate itself. In some implementations, the FPS 200 or GCS 213 may automatically define a flight plan based on various criteria, such as an inspection type.

While the UAV computer system autopilot module is navigating the UAV according to a flight plan, certain aspects of the flight pattern may be controlled by the operator's user device 212. The flight plan or pattern may be configured such that for a particular waypoint, a vertical ascent/descent rate, UAV altitude, horizontal UAV rotation, payload gimbal, payload direction, waypoint transition speed, or trigger of a payload sensor may be controlled by the operator. The user device 212 may have a physical control device such as a toggle or joystick, or virtual control in a user interface that allows the operator to control vertical ascent/descent rate, UAV altitude, UAV attitude, horizontal UAV rotation, payload gimbal, payload direction. The user device 212 can trigger a payload sensor while conducting the inspection. For example, the UAV may navigate via autopilot to a position over an inspection location. An operator then can provide input to the user device 212. The user device may transmit a signal or information corresponding to the user input to the UAV via radio communication. The signal or information can control the vertical ascent/descent rate, UAV altitude, UAV attitude, horizontal UAV rotation, payload gimbal, or payload direction, or waypoint transition speed. The signal or information to can trigger a payload sensor to turn on or turn off. This particular mode allows for partial autopilot control and partial or complete manual control of the UAV. Even though the operator may manually control certain aspects of the flight plan, if one has been set, the UAV can remain within a geofence boundary envelope and to remain within VLOS of the operator operating user device 212.

In another example, the UAV may be partially manually controlled by an operator using the user device 212 while the UAV is in autopilot mode. The UAV may receive a command from the user device 212 to nudge the UAV in a particular direction. In this case, the control input of the user device 212 causes the user device 212 to send a command to the UAV, instructing the UAV to move slightly, for example between 0.1 to 3 meters, in a particular direction (in an x, y, or z axis, or diagonally). The particular distance can be predetermined, or be variable based on the proximity to a structure. Nudging the UAV allows the operator to move the UAV away from the structure if the operator sees that the UAV flying too close to the structure. The nudge command may be provided any time to the UAV while it is operating in an auto-piloted mode. The UAV should still enforce geofence boundaries (if one has been set) and not allow a nudge to cause the UAV to move beyond a geofence boundary envelope.

The FPS 200 can include an analysis module 220, a report generation module 230 and a permission control module 240. The analysis module 220 is configured to analyze a flight plan and determine whether a flight path include any sections where a UAV is out of VLOS from a base location, and provides alerts to warn such possible VLOS occurrence. The report generation module 230 is configured to generate one or more flight reports. The flight reports can include flight data (e.g., path, duration and actions of control surfaces), sensor data (e.g., air pressure, temperature and humidity), and payload data (e.g., information gathered by a payload camera). The permission control module 240 is configured to impose one or more limits on flights of the UAV. The limits can include, for example, that the UAV shall stay inside or outside an envelope defined by geofences or by geographic coordinates, or that the UAV shall stay within VLOS of a base location (e.g., a location of user device 212).

Figure 3:
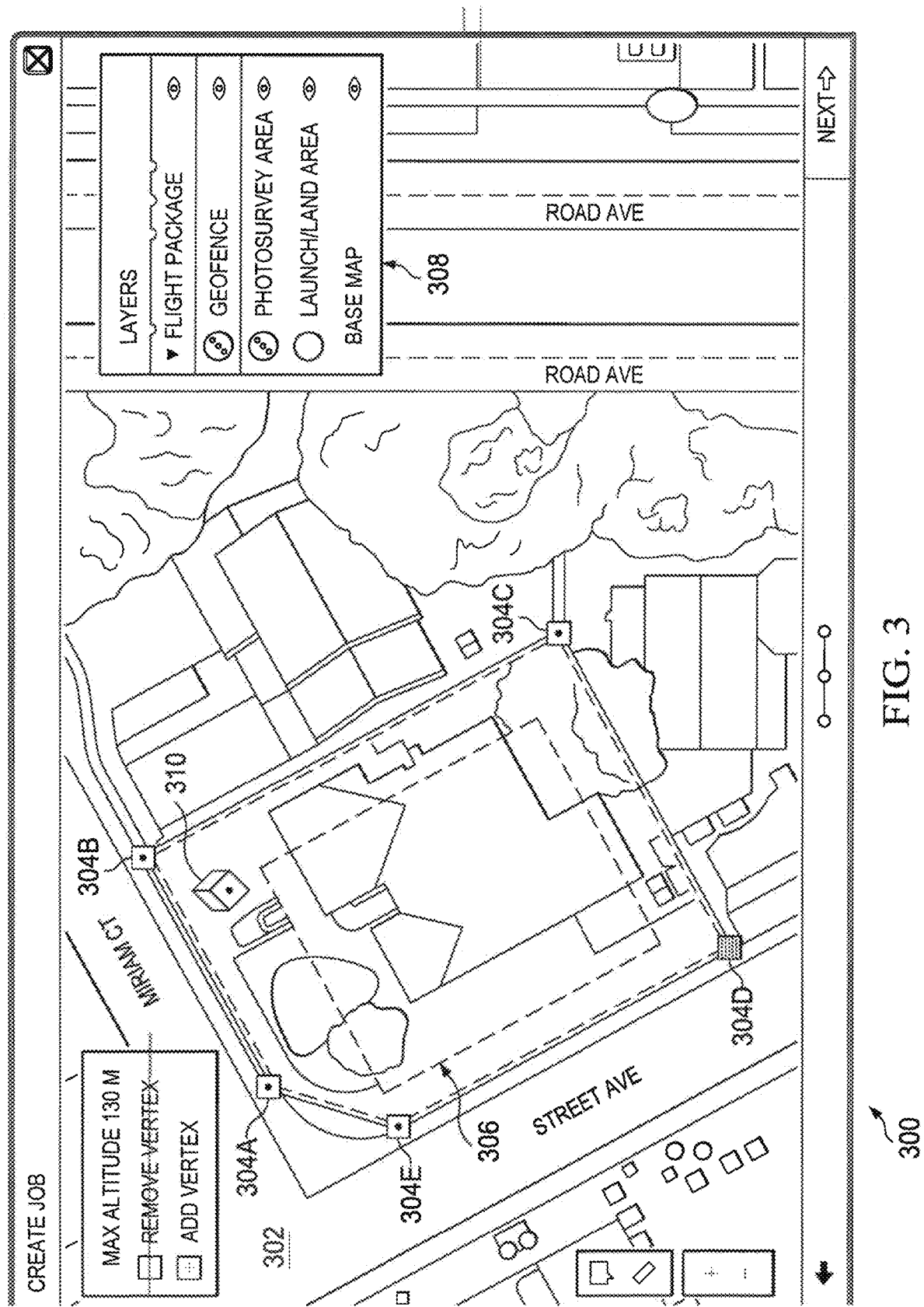
FIG. 3 illustrates an example user interface for determining a flight boundary geofence.

FIG. 3 illustrates an example user interface 300 for determining a geofence boundary. The user interface 300 is an example of an interactive user interface, generated by a system (e.g., the FPS 200, or a presentation system in communication with the FPS 200) that is configured to receive user inputs, access one or more databases, and update the user interface 300 in response to received user inputs. The user interface 300 can include a document (e.g., an interactive document such as a web page), or a web application, presented on a user device (e.g., a desktop, laptop, or tablet computer, a smart phone, or a wearable device, etc.).

The user interface 300 includes image 302 (e.g., satellite imagery as depicted) of a location entered by the user of the user interface 300. The image 302 included in the user interface 300 can be interactive. A user can zoom in and out of the image 302 to target a greater or smaller real-world area. For instance, the user can interact with a zoom control, or the user can utilize a touch surface (e.g., a touch screen) to zoom in and out (e.g., the user can pinch to zoom).

The user interface 300 enables the user to select areas on the image 302 that are defined by a user-specified shape. For example, the user interface 300 can receive a user selection of particular vertices that define the illustrated polygon (e.g., vertices 304A-E). The system can shade, or otherwise highlight, the internal portion of the user-specified shape. Additionally, the user interface 300 enables the user to select a particular vertex of the illustrated polygon (e.g., vertex 304A), and drag the shape into existence by moving a finger or stylus on a touch sensitive screen of the user device.

The user interface 300 can receive input for generating a flight path 306 for the UAV to include a launching and landing location 310. The user interface 300 may include a menu 308 for creating different representative layers of a flight plan. For example, menu 308 illustrates a flight plan specifying a geofence, a photo survey area, a launch/land area, and a base map. The menu 308 includes a geofence menu item that refers to the geofence as represented by the connected vertices 304A-304E. The menu 308 includes a photo survey area menu item representing the flight path 306. The menu 308 includes a launch/land area menu item representing the launching/landing locations 310. The menu 308 includes a base map menu item that represents the base image layer, which includes image 302.

As illustrated in FIG. 3, the image 302 includes a highlighted area that defines a geofence boundary to be enforced by a UAV when implementing a flight plan. Different types of geofences may be used by the UAV during flight operations. A geofence can include a two-dimensional (2D) or 3D location-based boundary. A geofence can be understood as a virtual boundary for a geographic location or a virtual surface around a geographic location in a 3D space. The geofence boundary can be represented on a map as one or more polygonal or rounded shapes, for example, a circle, rectangle, sphere, cylinder, cube, or other shapes or bodies. A geofence may also be a time-based (four-dimensional) virtual boundary where the geofence exists for a particular duration, for example, a number of hours or days, or for a specific time period, for example, from 2:00 PM to 4 PM occurring on certain days, or other periods of time. A 3D geofence may exist in a particular space above ground. A geofence may be represented by latitudinal and longitudinal connected points, or other coordinate systems. A geofence may be created such that the geofence has dynamic aspects where the geofence may increase or decrease in size based on various conditions. For UAV flight operations, geofence structures are received by the UAV and stored in non-volatile memory. The UAV can enforce a geofence, for example if the UAV moves outside of the geofence due to wind, location error (e.g., temporary location error, such as due to loss of GNSS), operator error (e.g., an operator assuming control of the UAV may be restricted from navigating outside of the geofence), the UAV can navigate back to within the geofence and optionally land at a landing area.

For UAV operations, different types of geofences may be created. To limit flight operations within a particular volumetric space, a 3D geofence may be created. Data representing the flight boundary geofence can be transmitted to the UAV operating system. The exemplary FPS or GCS may be used to create the geofence and transmit the geofence data structure to the UAV.

For both autonomous UAV flight operations and manually controlled flight operations, the UAV can be limited to flight within a flight boundary geofence. If for example, an operator of the UAV in a manually controlled mode attempts to maneuver the UAV outside of the flight boundary geofence, the UAV may detect a contingency condition (e.g., the UAV is about to fly outside of the geofence), and then automatically direct the UAV to return to a specified predetermined landing location. Furthermore, if the UAV is capable of hovering, such as a multi-rotor UAV, the UAV may be inhibited from moving across a flight boundary geofence, or perimeter, of the geofence, and the UAV can be set to hover and not continue past the perimeter of the geofence.

Optionally, the system can utilize property information, such as property boundaries, and automatically include a highlighted portion of the image 302 as being a possible flight boundary geofence. For instance, as illustrated in FIG. 3, portions of the flight boundary geofence defined by connected vertices 304A, 304B, 304C, 304D and 304E abut roads included in the real-world geographic area depicted in the image 302. The system can determine that the entered location information describes a particular property (e.g., an open clearing that borders the road), and can highlight the particular property. Optionally, the system can include a buffer from the property boundaries of the location to ensure that even when facing forces of nature (e.g., in a strong gust of wind), the UAV will remain within the property boundaries.

Property boundary information from a database can be used to create the flight boundary geofence to limit flight of the UAV within the property's boundary. The UAV can then be constrained for flight operations only within this geofence. The property information used to create the flight boundary geofence can be of various data types, for example, parcel polygons, vector, rasterized, shape files or other data types. For the particular property, the FPS 200 may create the flight boundary geofence based on the property shape data. The various data types ideally can have geolocation and/or coordinate information, such as latitudinal/longitudinal points for use in orienting and creating the flight boundary geofence. The geofence envelope may be identical in shape to the property boundary. Optionally, the boundary of the geofence may be reduced in size. For example, the flight boundary geofence may be reduced in size by a set distance, for example 5 meters, towards a centroid of the property. Reduction of the flight boundary geofence creates a buffer zone. The buffer zone may help avoid an unintentional flyover of an adjacent property boundary. Optionally, the FPS may display an area with parcel polygonal data. An interface of the FPS may then receive a selection of one or more parcels. The FPS then can use the selections to create one or more jobs, and multiple geofence envelopes. For the multiple parcels, the operator would go to each parcel property, and conduct multiple jobs.

Optionally, the user interface 300 can be utilized by a UAV operator to indicate waypoints to be traveled to during the flight plan. For instance, the user can select portions of the image 302 to designate as waypoints, and the user interface 300 can be updated to present selectable options associated with each waypoint. As an example, the user can designate an order that each waypoint is to be traveled to, actions the UAV is to take at the waypoint, a transition speed between each or all waypoints, and so on. The system can determine the flight boundary geofence from the waypoints, such that the geofence perimeter encompasses the waypoints. The determined flight boundary geofence can be presented to the user for review, and the user can modify the boundary by interacting with the user interface 300.

Additionally, the user interface 300 can include text provided by the user that describes the flight plan. A different user can access the user interface 300, and quickly view the determined flight boundary geofence along with text describing the flight plan. In this way, a user can quickly describe flight plan information sufficient for a UAV to implement, and other users can quickly view graphical representations of the flight plan (e.g., graphical representation of the flight boundary geofence along with textual data describing the flight plan).

Point Cloud Based Navigation

As described above, a point cloud can be utilized to inform generation of a flight plan. A point cloud can also be utilized to inform movements of a UAV during navigation.

To generate a point cloud, an initial flight plan can be performed by a UAV to obtain images from which the point cloud is to be generated. For example, the UAV receives a flight plan to automatically navigate the UAV over a physical structure, such as a house or a building. The UAV navigates to a threshold height and follows a flight path over the physical structure. At preselected intervals, based on a desired image overlap, the UAV triggers an onboard camera to obtain multiple aerial images. Ideally, the UAV may take the images at about the same altitude for each image.

The UAV may use one or more global navigation satellite system (GNSS) receivers to obtain a geo-spatial location of the UAV's position when it obtains an image. The UAV may also use an onboard digital camera that has GPS position identification. This type of camera may log the geo-spatial position of the camera to the digital image taken at a particular position.

To increase the overall accuracy of the point cloud, an operator may place a ground control point onto the ground near the physical structure and use the ground control point as a launch pad for the UAV. An operator can then place the UAV onto the launch pad. The GNSS receiver of the UAV can then obtain multiple readings for its positions. The readings then may be averaged, or further processed to obtain a position of the UAV (e.g., an accurate position). The launch pad can be of a large enough size, and include recognizable patterns thereon, to be captured at a particular resolution by the UAV at a desired altitude. In photogrammetry processing, for instance using images obtained by the UAV, the position of the UAV at the launch pad can be assigned as a ground control point.

A point cloud may be generated by various techniques. A point cloud is a collection of data points in a three-dimensional coordinate system with a data point being defined by x, y, z coordinates. A point cloud represents an external surface of a structure.

Of particular interest to the described invention is the use of aerial images obtained by a UAV and using a software program to generate the point cloud. For example, software such a Agisoft PhotoScan or Pix4Dmapper may be used to create a point cloud from the aerial images.

When generating a point cloud for a flat structure, each of the points in the point cloud do not necessarily form a plane; that is the z-coordinate may be above, below, or on the plane. As an example with respect to a driveway, when measured, the driveway may be straight, level and planar. However, when a point cloud is generated the data points may have slight variance in the z-direction. An understanding of variance in the z-direction is important for navigation of the UAV in reference to the point cloud.

Figure 4:
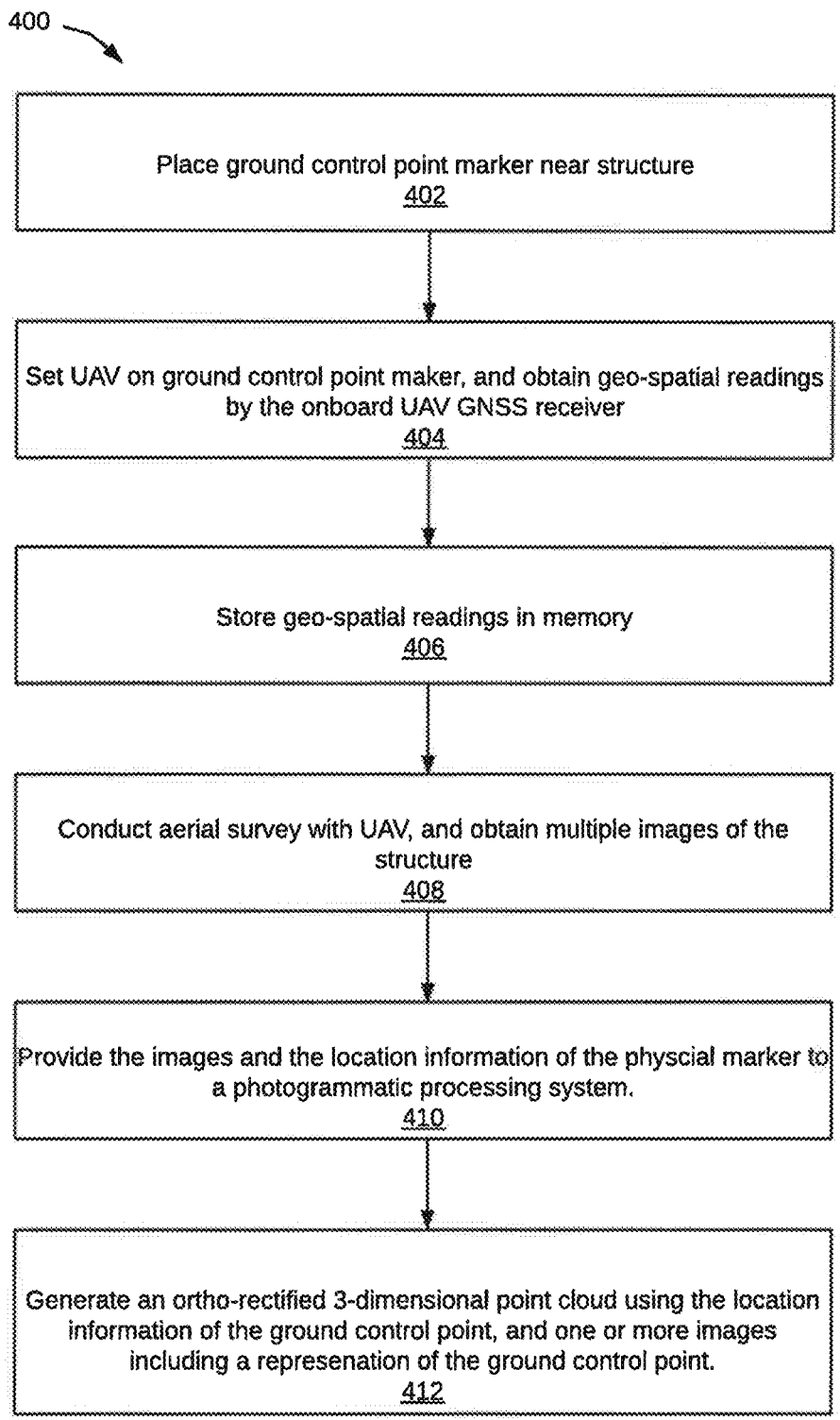
FIG. 4 is a flowchart of an example process for generating a point cloud.

FIG. 4 illustrates an example process 400 for generating a point cloud. For convenience, the process will be described as being performed by an unmanned aerial vehicle (UAV) of one or more processors, in combination with a system, such as a ground control system (GCS) or a flight planning system.

A ground control point marker may be placed near a structure (block 402). As described above, a structure can be associated with a flight plan to inspect the structure. To inform determination of the flight plan, a point cloud can be generated that includes the structure (e.g., a surface of the structure). A UAV can perform an initial flight plan to obtain images of the structure, and optionally a geographic area which includes the structure. While consistent results would be obtained by an automated flight plan, the UAV may be manually operated and images manually obtained via operator control of the ground control station.

To increase an accuracy associated with the point cloud, for instance reducing one or more errors associated with generating a point cloud, a ground control point marker can be utilized to provide accurate location information for, at least, the ground control point marker. In this way, for images obtained by the UAV that include the ground control point marker, accurate location information of the ground control point marker can be determined. With the accurate ground control point marker information, a system generating the point cloud can increase a mapping of each image to an earth reference frame (e.g., world geodetic system). To further increase, the accuracy with the point cloud, multiple ground control point markers may be placed around the structure. A geo-location of each of the one or more ground control markers may be obtained, and provided to the photogrammetry software to aid in production of the point cloud. Using an RTK system (Real Time Kinematic) to identify a precise location (e.g., GPS coordinate) of the ground control point will provide better results. However, a PPK system (Post-Processed Kinematic) system may be used to identify the ground control point location also. Lastly, other GPS/GNNS devices may be used to capture the location of each ground control point. The GPS coordinate of the ground control point may be received by the ground control station, or provided to the cloud system, or directly to the photogrammetry software.

While the description below describes use of a single ground control point marker, it should be understood that additional ground control point markers can be utilized in combination. For example, a particular number (e.g., 2, 3, 5) ground control point markers can be spaced around a geographic area in which the structure is included. Optionally, these additional ground control point markers can be of known distances from each other. That is, each ground control point marker can be placed such that they are of a known distance from each other. In this way, location information for a single ground control point marker can be determined, and location information of the remaining ground control point markers can be determined from the known distances. As an example, five ground control point markers may be placed a threshold distance from each other (e.g., a constellation of the ground control point markers can be created), for example 2 meters, 5 meters, or spaced farther about the geographic area. Each ground control point marker may include a unique identifier (e.g., a shape, symbol, QR code, and so on), such that the particular ground control point marker can be identified in images obtained by the UAV during navigation. The ground control marker may have electronic circuitry to wirelessly transmit the location of the marker to the ground control station or the cloud system.

A ground control point marker is therefore placed, for instance by an operator associated with the inspection, on a surface (e.g., the ground, driveway, optionally a location with less than a threshold variance in height) near the structure. The ground control point marker may optionally be placed on a particular location that is likely to be visible in greater than a threshold number of images obtained by the UAV during navigation. For example, if the structure being inspected is a house, the ground control point marker can be placed at a location a threshold distance from the house, such that the ground control point marker will not be hidden from view in the images.

A system can be utilized to analyze the geographic area in which the structure is included, and determine a location to place the ground control point marker. For example, the system can identify locations of objects, such as trees, other structures, and the structure being inspected, and can determine a location at which a majority of images will include. The system can then provide information to the operator identifying the location. As an example, the system, such as the GCS utilized by the operator, can present a map with a location at which the ground control point marker is to be placed. Optionally, as the operator moves about the geographic area towards the determined location, the GCS can identify when the operator is on, or within a threshold distance of, the determined location. For example, the GCS may present a map updated according to the operator's present position, and indicate a distance from the operator to the determined location. Additionally, the GCS can present an audible sound, vibrate, and so on, when the operator is located at the determined location.

The UAV is set on the ground control point marker, and the UAV obtains geo-spatial readings (block 404). Once the UAV is set upon the ground control point marker, the UAV can utilize an onboard GNSS receiver, and obtain location information, such as ellipsoidal coordinates (latitude, longitude) in WGS84 reference system, along with altitudes of the UAV. The UAV can therefore obtain its three-dimensional location in space.

To increase an accuracy associated with the UAV's location, the UAV can record a threshold number of geo-spatial readings, such as 10, 20, 30, and so on. A measure of central tendency of these geo-spatial readings can be determined, for instance a mean, median, or mode. Via averaging of the readings, noise with respect to the GNSS readings can be reduced. Additionally, the UAV may perform a filtering process to remove outlier measurements. As an example, if the UAV identifies a particular GNSS reading as being greater than a threshold from remaining readings (e.g., greater than a threshold from an average, greater than a particular variance from a mean), the UAV can filter the particular GNSS reading.

The readings of the UAV's location (e.g., geo-spatial readings) can be stored by the UAV, for example stored in non-volatile or volatile memory (block 406). The UAV can maintain a record of all of the readings, or optionally maintain a record of an average reading as described above. The stored location information can be utilized by a system to generate a point cloud. For example, an accurate (e.g., substantially accurate) location of the UAV can be determined through use of the threshold number of readings, and the system can rely on the location when generating the point cloud.

The UAV conducts an aerial survey and obtains images of the structure (block 406). The UAV can ascend from the ground control point marker upon location information being determined, as described above. For example, an operator can utilize a GCS to indicate that the UAV can ascend and begin the aerial survey. The GCS can be in communication with the UAV, and upon the UAV determining the threshold number of readings, the GCS can prompt the operator to indicate that the UAV can perform the aerial survey.

The aerial survey enables the UAV to navigate about the geographic area, and obtain images of the geographic area. For example, the UAV can obtain images of objects included in the geographic area along with the structure. To perform the aerial survey, the UAV can receive a flight plan that causes the UAV to navigate about the geographic area. Optionally, the flight plan can specify a geofence, such as a geofence based on a property boundary of the geographic area (e.g., a property boundary of a house), and such that the UAV is constrained to locations within the geofence. The flight plan can be generated by the GCS or by a flight planning system, for example as described above. The flight plan may indicate waypoints at which the UAV is to obtain images, for example images at substantially a same altitude, and the waypoints may have been indicated by a user (e.g., the operator, a different user). Optionally, the flight plan may have been automatically generated by the GCS or flight planning system based on images (e.g., satellite images) of the geographic area. That is, images of the geographic area can be analyzed, such that the structure is identified. A flight pattern can then be determined indicating that a UAV will navigate about the geographic area according to the flight pattern.

As an example of a flight pattern, the UAV can ascend from the ground control point marker to a particular altitude. The particular altitude can be based on a specified ground sampling distance, for example as described above, the ground sampling distance can indicate a required minimum level of detail to be included in images. For the aerial survey, the GSD can be set as a constant by the operator, for example the software and/or hardware utilized to generate a point cloud can indicate a particular level of detail to be included in images. Additionally, the GSD can be associated with a GSD to be obtained during a resulting inspection by a UAV. That is, if the structure is going to be inspected for damage with a high level of detail, the particular altitude for the aerial survey can be set lower such that a more detailed point cloud can be generated.

Upon ascending to the particular altitude, the UAV can then perform a flight pattern to encompass the geographic area. As an example, the UAV may move in a back and forth manner throughout for the geographic area, such as a flight pattern that causes the UAV to move along a same direction until reaching an extremity of the geographic area (e.g., geofence), then translating along a perpendicular direction a threshold distance, and moving back along the same direction until reaching an opposite extremity. Other flight patterns can be utilized, and the UAV can proceed with a flight pattern until images of the geographic area, or the structure, or within a threshold lateral distance of the structure, are obtained.

Optionally, as the UAV ascends form the ground control point marker the UAV can obtain geo-spatial readings. Since the UAV is moving substantially along a horizontal direction (e.g., the UAV can minimize lateral movements), the UAV can obtain geo-spatial readings for later comparison to the accurate location obtained while on the ground control point marker. These additional readings may inform a determination of an error associated with the UAV's GNSS receiver. Optionally, these readings may be corrected when a point cloud is generated. For example, since the UAV is ascending while minimizing lateral movements, a system can modify the GNSS readings to conform to the more accurate location determination while the UAV was located on the ground control point marker. The UAV may optionally record inertial measurement unit (IMU) information, such that the UAV can determine an extent to which it moved laterally, for example without direct use of the GNSS receiver. Additionally, the UAV may monitor its altitude via an altitude sensor, such as a barometer, lidar, leddar, sonar, and so on, and this altitude information can be used to modify GNSS readings as the UAV ascends. For example, the altitude sensor information can be considered more accurate than the GNSS readings, and the system (e.g., the system generating the point cloud) may utilize the altitude sensor information to provide corrections to the GNSS readings. Optionally, as described above the flight pattern may cause the UAV to obtain images at a same altitude. In this case, the altitude information can be utilized to modify (e.g., normalize) the GNSS readings. For example, since the UAV, via the altitude sensor, can be determined to be navigating at substantially a same altitude, a system can determine an error associated with the altitude determination via the GNSS receiver.

The UAV provides the obtained images, location information of the ground control point marker, to a system (such as a ground control station, cloud system, or available computer system having graphics processing capabilities to generate a point cloud.) (block 410). As described above, the UAV can obtain images of the geographic area in which the structure is located, and each image can include location information associated with the UAV at a time the image was captured, and optionally camera information, such as a camera pose (e.g., the camera may optionally be always pointing directly down), focal length, resolution of the sensor, and so on. The images may be stored by the UAV onto a data storage device, such as an SD card, or onto a hard drive, or other storage device. The images may be transferred to the ground control station, via the SD card, a wired tether, such as a USB or other cable, or wirelessly. The images also may be transferred from the UAV, or the images from the ground control station, to the cloud system.

Upon landing, for example at a safe landing location such as back on the ground control point marker or a different location, the UAV can provide (e.g., over a wired or wireless connection) the images and location information, to a system for processing. Example systems can include the GCS, or the flight planning system which may obtain the images and location information over a network (e.g., the internet, for instance through a wireless connection).

The system can utilize photogrammetric processing, such as a particular software suite as described above, to generate a point cloud (block 412). The images may be processed on the ground control station, or by the cloud system to generate the point cloud, or another connected system. For example, ground control station or the cloud system may perform the photogrammetry software and use the obtained images, and optionally, images of the ground control points, and their designated geo-spatial locations (e.g., the GPS coordinates). If the point cloud is generated by the cloud system or another connected system, the ground control station may receive the generated point cloud from the cloud system or other connected system to be used as contemplated here. As an overview, the software may determine features (e.g., interesting or unique features) in images, and determine overlaps between the images based, at least in part, on the features. Utilizing location information of each image (e.g., the lateral location can be specified via GNSS readings, and the altitude can be specified via an altitude sensor), plus disparate viewpoints of portions of the geographical area obtained as the UAV navigates, the software can generate a point cloud that includes points assigned three-dimensional locations. The software may then perform a densification process, such that the initially determined point cloud is filled in, and more points are included in the point cloud.

Since the UAV obtained an accurate reading of the ground control point marker, as described above, the ground control point marker can be utilized as an anchor point at which location information can assumed to be true. The software can utilize this information to inform the point cloud determination. Additionally, the software may generate an orthomosaic, such as a geo-rectified image, of the obtained images. The orthomosaic may include the obtained images, which have been combined or stitched together, and the orthomosaic may assign location information to points within the orthomosaic. The location information can be substantially accurate according to the accuracy of the ground control point marker, and GNSS, altitude sensors, readings as the UAV navigates about the geographic area. As described above, additional ground control point markers may be utilized, and the additional ground control point markers may enable a more accurate point cloud and/or orthomosaic.

Figure 5:
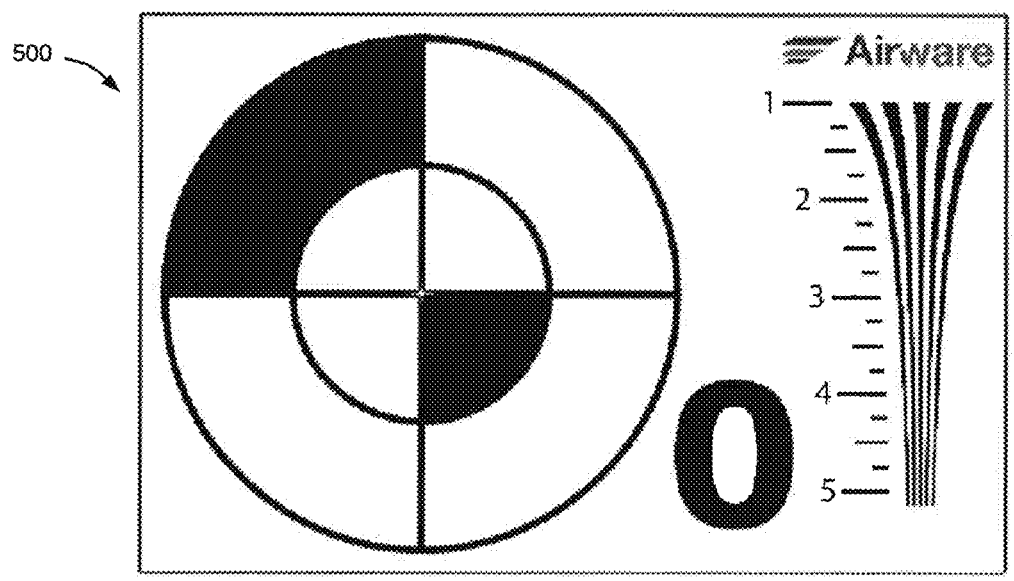
FIG. 5 illustrates an example of a ground control point marker.

FIG. 5 illustrates an example of a ground control point marker 500 that may be utilized as a reference point to aid in generation of the point cloud. As described above, the GCP marker can be placed near the structure, and the UAV placed on the center of the ground control point marker 500 (e.g., the circular pattern.) Once placed on the GCP marker the UAV may then obtain geo-spatial locations of the UAV.

As illustrated, the circular pattern includes different portions, each of which can be assigned a different color (e.g., black or white as illustrated, but can be arbitrary red, green, blue, and so on). In this way, the circular pattern may be encoded with a particular identity (e.g., the circular pattern may include 8, 10, 12, 16 bits of information). If other ground control point markers are utilized, each ground control point marker may be identified in images captured by the UAV via their encoded identities. Optionally, the ground control point marker 500 can include a display such that different patterns may be placed on the ground control point marker 500. For example, 5 ground control point markers all of a same model can be brought to a geographic area, and the ground control point markers can dynamically update their identifications to be different from the remaining ground control point markers. The GCS may provide information to each ground control point marker (e.g., over a wired or wireless connection) indicating an identity, pattern to display, and so on. Additionally, the ground control point markers may self-identify to each other, and determine a particular pattern to display so that all display a different pattern.

Optionally, a group of ground control point markers (e.g., a set of 5) may be configured to be attached to each other via lengths of material (e.g., rope, a hard plastic, metal, and so on) that are known. That is, an operator may place the ground control point markers in a geographic area, and connect them with the lengths of material (e.g., each ground control point marker may be configured to receive the material, such as via a connection). Once the ground control point markers are fully separated according to lengths of material (e.g., solid bars may connect each ground control point marker to each other), a UAV may be placed on one to determine its accurate location. Since the remaining ground control point markers are of a known distance from the marker on which the UAV was placed, location information for the remaining markers can be determined. In this way, when generating a point cloud the system can utilize the additional markers to better inform location information of included points.

The example ground control point marker 500 further includes an identification of a particular resolution, such that an indication of a level of detail included in an image can be determined. That is, a determination of a degree to which a camera can resolve fine detail is placed on the ground control point marker 500.

Figure 6:
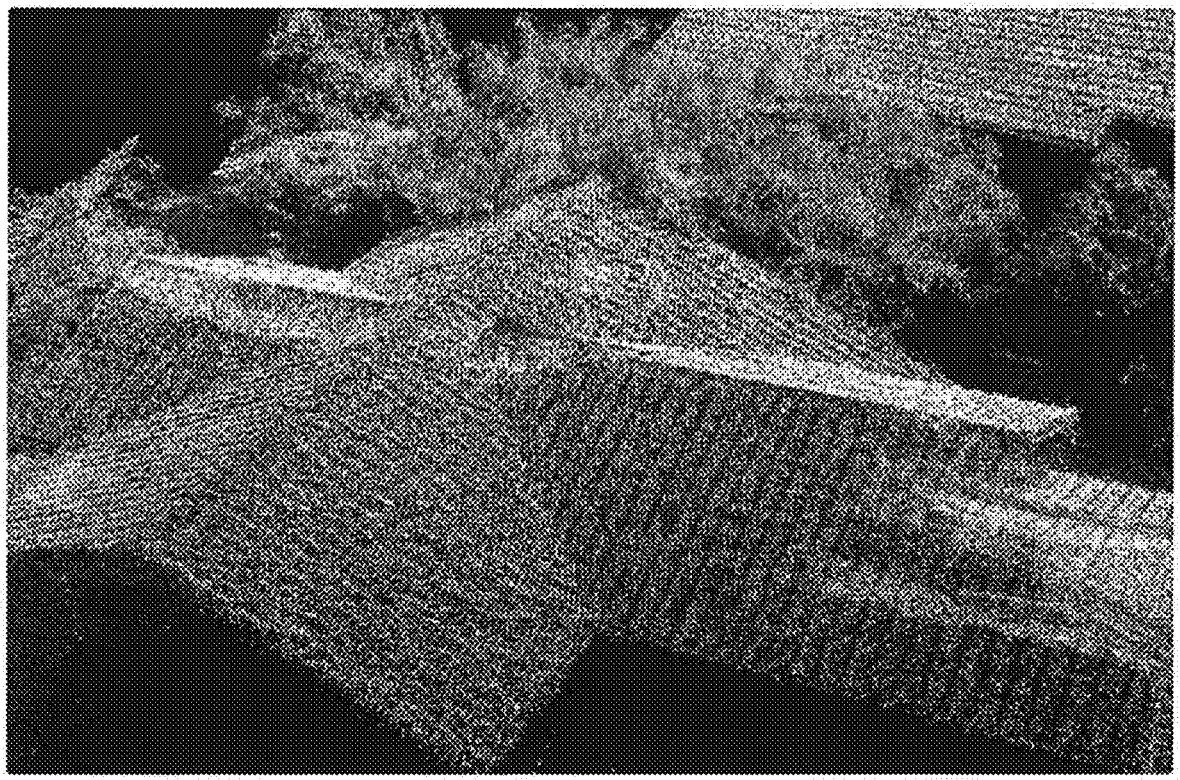
FIG. 6 illustrates a graphical representation of a point cloud.

FIG. 6 illustrates an example generated point cloud 600, for example as described above with respect to FIG. 4. The structure in the example point cloud 600 is a house, and objects included in a same geographic area are also included. For example, the objects include foliage (e.g., trees, bushes), a portion of a different house, and so on. As illustrated, the point cloud 600 includes points that are located on a surface of the structure and objects, such as the rooftop of the house. Each point can be represented as an x,y,z coordinate optionally with an associated color value (e.g., red, green, blue, value). As described above, location information associated with each point can be determined, such that, for example, a height of each point can be determined. As will be described, the height of a surface (e.g., contour) of the rooftop in the point cloud 600 can be utilized to inform whether a UAV is able to perform a flight plan without colliding with the structure.

Figure 7A:
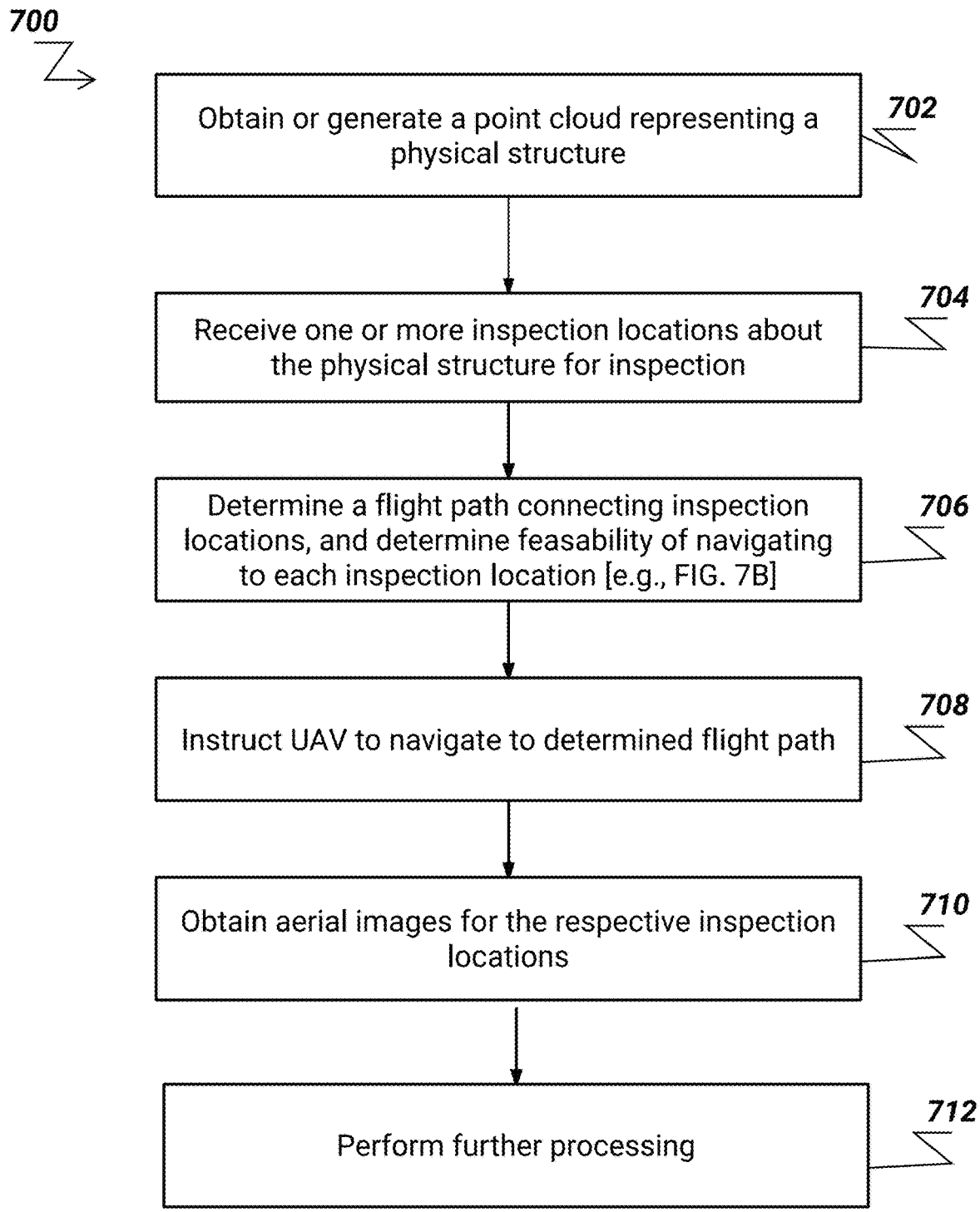
FIG. 7A is a flowchart of an example process to determine a flight path for the UAV to follow around the physical structure.

FIG. 7A is a flowchart of an example process 700 to determine a flight path for the UAV to follow around a physical structure. For convenience, the process 700 will be described as being performed by a system of one or more processors (e.g., the GCS, or flight planning system).

The system obtains a point cloud representing a structure (block 702). As described above, with respect to FIG. 4, a UAV can obtain images of a geographic area that includes a point cloud. For example, an operator may place the UAV on a ground control point marker, and the UAV can ascend and perform an aerial survey. These images can be processed by the system to obtain a point cloud of points assigned location information. Optionally, the operator can re-use a prior generated point cloud. For example, if a point cloud of the geographic area, physical structure, was obtained within a threshold time period, the system may recommend re-use of the same point cloud. In this way, processing time can be reduced, along with unnecessary use of the UAV. The operator may override the system's recommendation, for instance the operator may identify a newly included object (e.g., a new tree may have been planted), and the operator may indicate that new images are to be obtained of the geographic area.

The system receives inspection locations about the structure (block 704). As described above, a flight plan can be generated, with the flight plan including waypoints (e.g., inspection locations) indicating particular actions to take at each waypoint. Example actions can include activating sensors, obtaining images, descending from a lateral position associated with the waypoint, rotating, and so on. The flight plan may be described by the operator while proximate to the structure, or the flight plan may have been previously defined. For example, the GCS may include a pre-planned flight plan, or the GCS may communicate with a flight planning system while located proximate to the structure (e.g., over a wireless connection) and obtain a flight plan.

The system determines a flight path, and determines feasibility of navigating to each inspection location along the flight path (block 706). As will be described in more detail below, with respect to FIG. 7B, the system determines a flight path connecting the inspection locations, and ensures that a UAV will not collide with the structure. For example, the system can utilize sources of error associated with the point cloud and UAV's ability to determine its location and navigate, to determine offsets from the structure that the UAV has to remain to avoid collision. As will be described, the system can determine buffers surrounding the UAV and structure, and ensure that these buffers will not collide during an actual navigation of a flight plan. In this way, the system can simulate an actual flight plan as implemented by a UAV, and reduce a likelihood of a collision.

The system may also determine recommendations of modifying locations of inspection locations. For example, the system may present information to a user indicating that a particular inspection location is not feasible to navigate to, and can present a closest inspection location that is acceptable. As an example, a tall chimney may be included on a rooftop. An example inspection location may be a threshold lateral distance from the tall chimney, and which is further either (1) within a threshold distance from a top of the chimney or (2) below a top of the chimney and above the rooftop. The system may determine that the UAV is in danger of colliding with the chimney, and recommend that the inspection location moved laterally further from the chimney, or that the inspection location be placed at a greater altitude.

The system instructs the UAV to navigate via the determined flight path (block 708). Once the feasibility of the flight path is determined, the system can provide a determined flight plan (e.g., flight path, optionally geofence information, and so on) to the UAV for implementation.

The system obtains aerial images for the inspection locations (block 710). The UAV can implement the flight plan, and obtain images of the structure, for example at the inspection locations. Since the flight plan was determined to be feasible, a likelihood of the UAV colliding with the structure can be reduced. Additionally, to further reduce the likelihood, the point cloud may also be utilized while the UAV is performing the inspection. Using a point cloud during navigation is described in more detail below.

The system performs further processing on the obtained aerial images (block 712). The system, or an outside system in communication with the system, can utilize the images to perform further processing. For example, damage to the structure (e.g., damage to a rooftop) can be determined from the images. As another example, a three-dimensional representation may be generated from the images. The images may be provided for storage, for instance cloud storage, such that they can be referenced in the future.

Figure 7B:
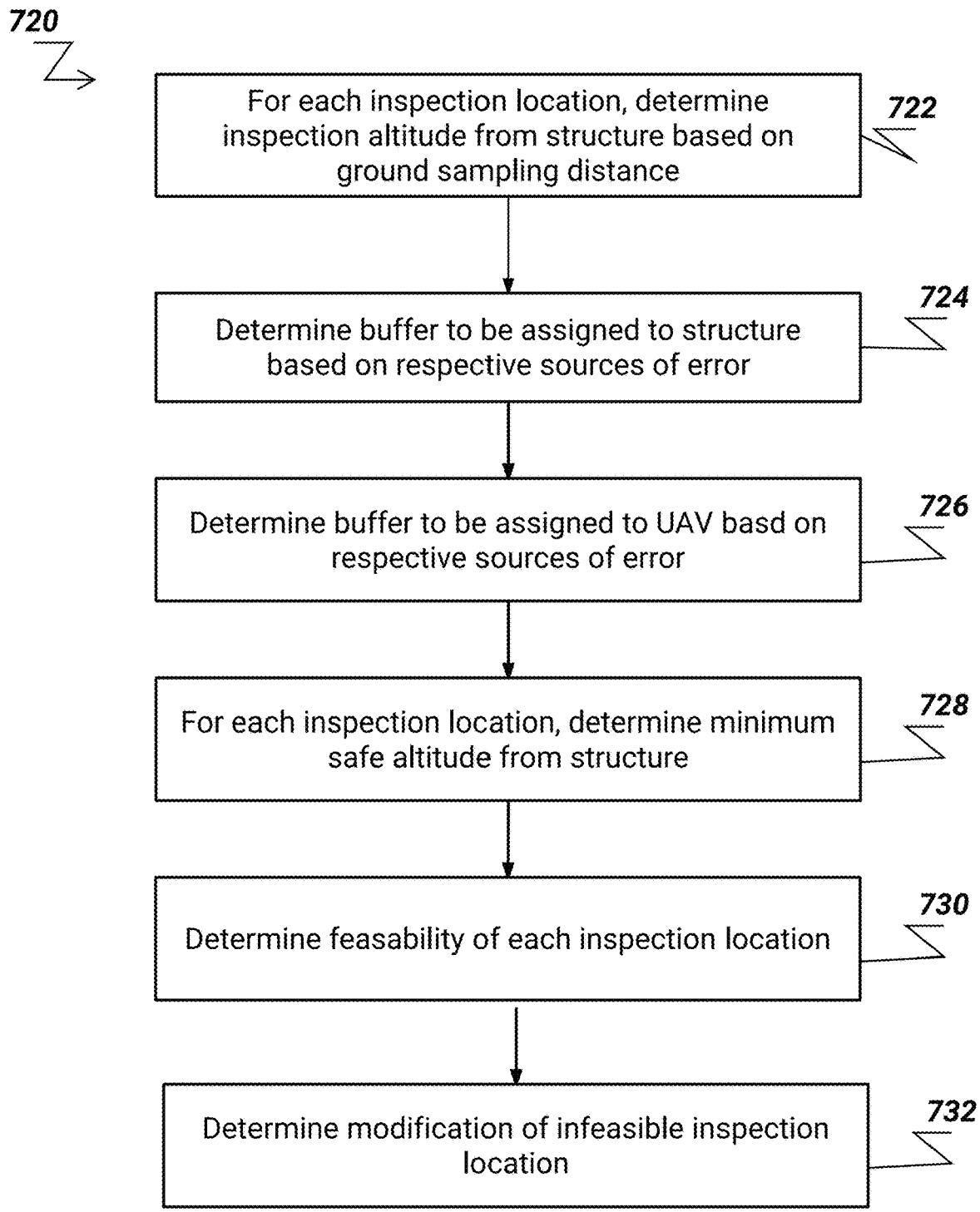
FIG. 7B is a flowchart of an example process for determining feasibility of waypoints along the flight path.

FIG. 7B is a flowchart of an example process 720 for determining feasibility of waypoints along the flight path. For convenience, the process 720 will be described as being performed by a system of one or more processors (e.g., the GCS or the flight planning system).

As described above, with respect to FIG. 7A, the system can determine whether a UAV navigating to inspection locations is feasible. That is, feasibility can indicate whether a likelihood that the UAV is going to collide with a structure being inspected is less than a threshold.

The system determines an inspection altitude associated with each indicated waypoint (block 722). During the inspection of the structure, the UAV can obtain images with at least a particular level of detail indicated by a user (e.g., the operator described above) or the system (e.g., the system may store a standard value, which can be based on a type of the structure or type of damage inspection being performed). As described above, level of detail can be represented by identifying a ground sampling distance (GSD).

Ground sampling distance (GSD) for an aerial digital photo can be a distance between a center of each pixel relative to a measurement of the ground. A GSD of 10 cm can represent that one pixel of an image represents linearly 10 cm on the ground (or 10 cm*10 cm=100 square centimeters). A GSD of 1 m can represent that one pixel represents linearly 1 meter on the ground.

For higher resolution images the GSD may be smaller. In certain applications, a desired GSD can be required. For example, it may be required to obtain detailed images of a rooftop structure within a particular GSD. A minimum height of the camera above the structure can be determined. For example, GSD=(sensor width of the camera*altitude above the surface*100)/(focal length of the camera*the image width in pixels). The altitude for a desired GSD can be found by Altitude above the surface=(focal length of the camera*image width in pixels*GSD)/(sensor width of the camera*100). If a GSD of 0.25 cm/pixel is desired using a 15 mm focal length and a 25 mm focal length for a camera with a sensor width of 4 mm, an image width of 4000 pixels, and an image height of 3000 pixels minimum desired altitude for the 15 mmm and 25 mm focal length lens would be computed as follows: for the 15 mm lens; Altitude=(15*4000*0.25)/(4*100)=37.5 m. For the 25 mm lens; Altitude=(25*4000*0.25)/(4*100)=62.5 m. Thus to obtain a GSD of at least 0.25 cm/pixel resolution, or better, the camera can be designated as being no more than 37.5 meters above the surface of the target (e.g., structure) when using the 15 mm focal length lens, and no more than 62.5 meters above the target when using the 25 mm focal length lens.

The system can determine, for each inspection location, a respective maximum altitude the UAV may fly above the inspection location to obtain a desired GSD. For example, to determine if the UAV will be able to ascend down over a structure for a point inspection of an area. The highest altitude above the surface to be imaged may be computed. For example, if a desired GSD of 0.1 cm/pixel is desired using the 15 mm focal length lens as described above, then the height above a surface of structure should be no more than 15 meters; Altitude=(15*4000*0.1)/(4*100)=15 m.

In this way, an inspection altitude for each inspection location can be determined based on a designated GSD. Additionally, the system can utilize the point cloud to determine points on the structure that are to be captured by the UAV at each inspection location. For example, as described above the inspection altitude can be based on obtaining images of the structure at the desired GSD. Since the structure may slope upwards or downwards in an image, portions of the image may therefore include a greater level, or lesser level, of detail. The system can optionally utilize the point cloud to determine a variance in height associated with the structure at each inspection location, and can determine a particular inspection altitude such that (1) all of the points are obtained at the desired GSD, (2) an average point is obtained at the desired GSD, and so on. As an example, the system can obtain heights of points included in a particular area (e.g., circle of a radius), and can determine an average height of the points from the point cloud. An example area can include an area of the structure that would be included in a center portion of an image obtained by the UAV. The system can then determine an inspection altitude based on the average height of the points, such that the average location in the image will include the level of detail. Optionally, this determined inspection altitude may be considered as a minimum acceptable inspection altitude, and the system may prefer that all points of the structure in the image are obtained at the desired GSD. As will be described, the system can determine feasibility of each waypoint, and can therefore cause the UAV to be closer to the structure to obtain the desired GSD if it's feasible.

The system determines a buffer associated with the structure (block 724). As described above, the point cloud of the structure can include sources of error. Example sources of error can include location error of the UAV while capturing images during the initial aerial inspection (e.g., described in FIG. 4), such that points within the point cloud can be shifted from their true (e.g., accurate, with respect to the real-world) coordinates. Additionally, global sources of error may affect the location of the structure. As an example, the structure may be laterally shifted in location from its true (e.g., accurate) location. This may occur if the UAV's determination of its location while positioned on the ground control point marker was off, such that when generating the point cloud, the ground control point marker provided inaccurate information. Additionally, error associated with GNSS readings may be variable according to a particular time the initial aerial inspection was performed. For example, particular flights may result in GNSS readings that are within a smaller variance than other flights. This can occur based on the position of GNSS satellites, interference, and so on. The system can utilize this variance to inform a determination of a size of a buffer, for example as described below.

Based on, at least, these sources of error with respect to the point cloud, the system can determine a buffer extending from a surface of the structure. This buffer can be of a particular distance from the surface (e.g., 2 meters, 3 meters), and can represent a portion of space that is uncertain, such that if a UAV enters into this space it may end up colliding with the structure in the real world. Optionally, the buffer may be statistical, such that the system can determine a confidence that the real-world structure exists below a distance from a height of the structure as indicated in the point cloud. For example, the system may determine that at 5 meters from the surface of the structure as identified in the point cloud, a confidence that a real-world structure is below that height is a particular value (e.g., 99% confident). As the distance from the surface reduces (e.g., 10 centimeters from the structure as identified in the point cloud), the confidence can decrease. To determine a size of the buffer, machine learning models can be utilized that incorporate sources of error, and can be trained on actual measurements of heights of structures as compared to generated point clouds.

The system determines a buffer associated with the UAV (block 726). Similar to determining a buffer about the structure, the system can determine a buffer surrounding the UAV according to sources of error. For example, while the UAV is in flight it can actively monitor its location utilizing a GNSS sensor, altitude sensor, inertial measurement unit (IMU) readings, and so on. As described above, the GNSS sensor is associated with a source of error, and the UAV's precise location in a real-world may be unable to be precisely determined. Therefore, the UAV may be located a threshold distance (e.g., lateral distance) from where it thinks it is located. If the UAV includes an altitude sensor, the UAV may rely on this sensor to determine its altitude, which may be more precise than its lateral location determined using the GNSS sensor. Therefore, as the UAV moves about the real-world, its precise location can exist within a buffer of space to a threshold degree of confidence (e.g., 90%, 99%).

The system determines a buffer surrounding the UAV that indicates a volume of space in which the UAV is likely (e.g., greater than the threshold degree of confidence) to be located. As above, the system can utilize machine learning models to inform the determination of the buffer, and the buffer can be a particular distance from the extremities of the UAV (e.g., 1 meter, 2 meters). Optionally, if the system does not have access to a size of the UAV that will be performing the inspection, the system can utilize an average size of UAVs (e.g., average size of UAVs of a same type). Since not knowing a size of the UAV can increase an error associated with its actual location while navigating, the system may increase the buffer. Furthermore, the buffer may be of a spherical shape surrounding the UAV, a rectangular shape, or an arbitrary polygonal shape according to error extending as a vector from each location on the UAV. As an example, the UAV may be more accurately determined to be at a particular altitude than at a particular lateral location. Therefore, the buffer may be larger to the left and right of the UAV, than on the bottom. Similarly, the UAV may be more accurate determined to be at a lateral location than at a particular altitude. Optionally, the system can obtain weather information associated with a time at which the inspection flight is to take place, and can modify the buffer based on a presence of wind. For example, the buffer can be increased as the wind increases beyond thresholds at which the UAV can maintain in a stable fashion.

The system determines for each inspection location, a minimum safe altitude from the structure (block 728). The system obtains a highest point on a surface of the structure at each waypoint (e.g., a highest point being imaged, such as would be included in a center of a camera pointed directly downwards), and utilizes the highest point as the tallest portion of the structure that may pose a collision risk. Since the point cloud may include error, and particular altitudes of points may be erroneous (e.g., an altitude substantially greater than the other altitudes of nearby points), the system may optionally filter these points.

The system then compares the buffer of the structure to the buffer of UAV, and determines a minimum altitude of the UAV that is unlikely to result in a collision. For example, as described above each buffer can be of a particular size, and the system can merely compare a size of a buffer extending from the surface to a size of a buffer surrounding the UAV. An altitude at which these locations do not touch, can represent the minimum safe altitude. As another example, for buffers that are statistical in nature, the system can determine an altitude at which a combination of the buffers results in a confidence in a collision being less than a threshold (e.g. 1%, 5%), or a confidence in there not being a collision being greater than at threshold (e.g., 90%, 95%). As an example, the system can combine (e.g., optionally utilizing machine learning models) the confidences in each buffer, and determine an overlap at which the UAV is considered to not be in danger of collision.

The system determines feasibility of each inspection location (block 730). The system can then compare whether, at each inspection location, the UAV's inspection altitude is greater than the minimum safe altitude. For example, if the UAV has to be at a first altitude to obtain images of the structure at a desired GSD, and the first altitude is closer to the structure than a minimum safe altitude, then the system can determine that the inspection location is infeasible. Optionally, the system can compare a flight pattern that would be required to connect each inspection location, and whether the UAV is capable of making the maneuvers. For example, the UAV may be able to reliably move within a threshold tolerance, but be unable to reliably move at a finer tolerance. The system may optionally modify a flight pattern such that, based on capabilities of the UAV, the UAV will not be at a risk of collision. Additionally, for particular structures in which that is not possible (e.g., the UAV is forced to make fine movements during the flight), the system may indicate an infeasibility of the flight pattern.

Furthermore, while reference was made to altitude, the system can utilize the minimum safe altitude to similarly inform whether a UAV will be too close to portions of the structure that are lateral from the UAV. For example, a chimney or another object may be located laterally from the UAV. The UAV might be at greater than the minimum safe altitude from a portion of the structure it's imaging (e.g., the portion can be directly below the UAV), but the UAV may be too close to a chimney located next to the UAV. That is, the system can compare the buffers of the structure (e.g., as extending laterally from the chimney) to the buffer of the UAV, and determine that the inspection location is infeasible.

For an infeasible inspection location, the system can present information to a user (e.g., the operator) indicating that the inspection location may result in a collision. The user may be blocked from implementing the inspection, or optionally the user may override the determination and proceed.

The system determines a modification of an infeasible inspection location (block 732). The system may recommend moving the inspection location to a different location, such that the inspection is feasible. For example, the system can recommend moving the inspection location upwards, such that a same perspective (e.g., an orthonormal perspective with a camera facing downwards) can be obtained. The new location may not result in a GSD being obtained, however it may represent a best case. Additionally, the system may recommend that the new location be moved at an angle, for example the new location can be at a greater altitude which is moved laterally from the inspection location. This may alter the perspective of the image, but may be able to obtain images at the desired GSD. The user can optionally identify his/her preference, and the system can present visual representations of each modified location for approval to the user.

Figure 8:
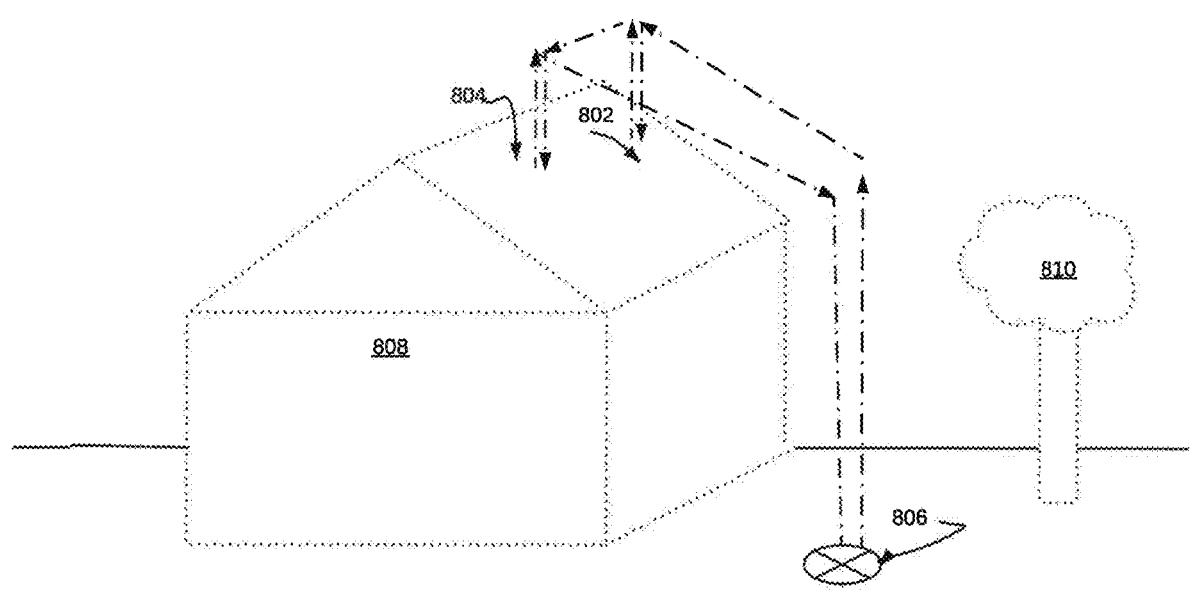
FIG. 8 illustrates an example of determining a flight path for the UAV to follow around the physical structure.

FIG. 8 illustrates an example of determining a flight path for a UAV to follow around a physical structure 808. The UAV system receives a selection of one or more points for inspection about the structure 808. For example, a ground control station (GCS) may present a geo-rectified image or images of the structure. Via the GCS user interface, one or more, points of inspection may be selected. The inspection points may be represented as x, y, z coordinates in relationship to the point cloud. In FIG. 8, the user has selected two locations 802 and 804. Also, a ground location has been selected in the GCS. The GCS can calculate a flight path by selecting a path that is free from obstructions. As described above, the GCS can ensure that the UAV's likelihood of colliding with the structure 808, or other objects (e.g., tree 810), is below a threshold.

Portions of the description below refer to unmanned aerial vehicles (UAVs) determining information, for instance utilizing generated point clouds to aid in navigation. It should be understood that in all cases, the ground control system (GCS) in communication with the UAV can provide instructions to the UAV, control the UAV, and so on, for example based on received location information from the UAV in comparison to generated point clouds. That is, the GCS can optionally perform the features described below.

Figure 9:
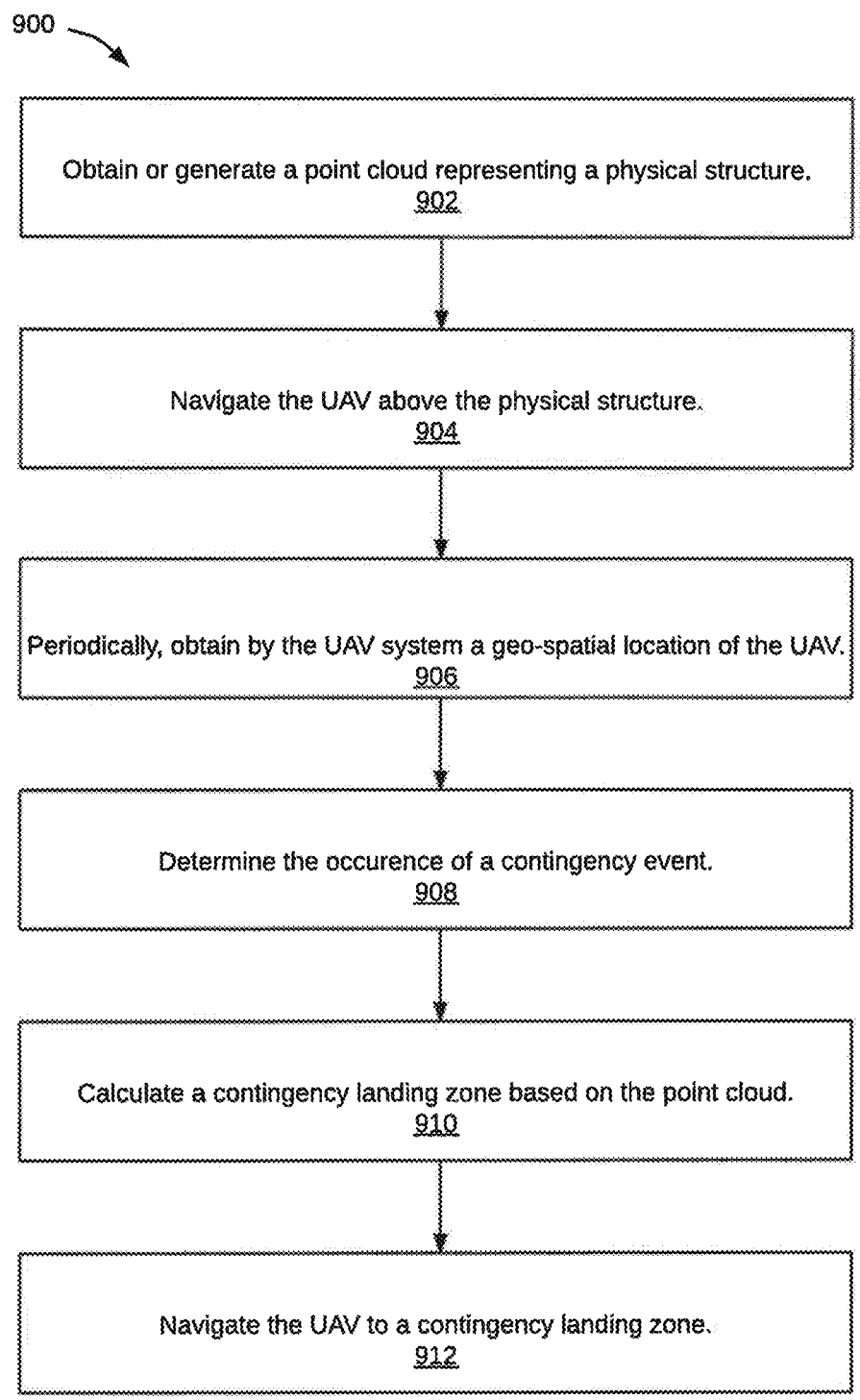
FIG. 9 is a flowchart of an example process for determining the fastest route to return home and land from a given position around the physical structure FIG. 10 an example of a UAV determining the fastest route to return home and land from a given position around a physical structure.

FIG. 9 is a flowchart of an example process 900 for determining a fastest route to return home and land from a given position around the physical structure. For convenience, the process 900 will be described as being performed by an unmanned aerial vehicle of one or more processors.

The UAV obtains a point cloud representing a physical structure (block 902). As described above, with respect to FIG. 4, a system can generate a point cloud based on images obtained of a structure during an initial flight. A UAV can optionally utilize the point cloud in flight, for example to determine a fastest route to a landing location as will be described.

The UAV navigates about the physical structure (block 904). As described above, the UAV may perform an inspection for damage of the physical structure. The flight plan being implemented by the UAV can be determined, for instance by a ground control system (GCS), to be clear of collisions.

The UAV periodically obtains geo-spatial locations of the UAV (block 906). As the UAV navigates, the UAV can monitor its location in three-dimensional space, and ensure that it maintains navigation along a flight pattern specified in the flight plan.

The UAV determines the occurrence of a contingency event (block 908). The UAV can determine a contingency event, such as that a battery of the UAV is below a threshold, the UAV has crossed over a geofence, a temporary flight restriction (TFR) was put in place for a same geographic area, or an operator indicates that the UAV is to land.

The UAV calculates a contingency landing zone based on the point cloud (block 910). The UAV can utilize the point cloud to determine a path to a particular landing zone, such as a pre-defined landing zone, a landing zone selected by the operator, or a landing zone indicated in the point cloud as being clear of obstructions. To determine the path to the particular landing zone, the UAV can determine a path that will not result in a collision with the structure being inspected or with objects included in the geographic area. As an example, the UAV may determine that it can move laterally from the structure, and then immediately proceed downwards to a landing location. In contrast, without use of the point cloud the UAV may be required to ascend to an altitude above any interferences, move laterally above the landing location, and then descend. In this way, the point cloud can provide a holistic view of all obstructions within the geographic area, and the UAV can determine a path to avoid such obstructions.

Optionally, the UAV can utilize the determined buffers, for example as described above with respect to FIG. 7B, and can ensure that the buffer of the structure and the buffer of the UAV will not interfere. The UAV may optionally modify a size of the buffer of the UAV according to (1) configuration information of the UAV or (2) determined accuracy of GNSS readings. For example, the UAV may include a distance sensor capable of determining distances from approaching objects. This distance sensor may be located along particular directions of the UAV (e.g., facing downwards, facing forward), and the UAV can therefore reduce the buffer of the UAV along these directions. Similarly, the UAV can decrease, or increase, a buffer according to accuracy of its GNSS readings. That is, the UAV can monitor variances determined from the GNSS readings, and can increase a size of the buffer if its GNSS readings are inaccurate (e.g., more inaccurate than average). Additionally, a size of the UAV can be designated (e.g., the GCS can provide a size, the UAV can obtain information identifying its size), such that a buffer surrounding the UAV can be more precisely determined. Furthermore, the buffer can be modified according to wind conditions. That is, as the wind increases beyond speeds at which the UAV can navigate while not being moved around by the wind greater than a threshold distance, the buffer can be increased to account for the uncertainty in position.

Optionally, the UAV may communicate with the GCS over a wireless connection, and the GCS may perform the determination of a path to the landing zone, and/or determine a location of the landing zone. Additionally, a user of the GCS may approve any determined path to ensure that the UAV will not be damaged (e.g., the GCS can present a graphical depiction of the path).

The UAV navigates to the contingency landing zone (block 912). The UAV can then implement the determined path, and navigate to the contingency landing zone. As the UAV navigates, it can utilize its location as compared to the point cloud, to ensure that it is not too close to a structure or objet. Optionally, if the UAV includes distance sensors, stereo cameras, and so on, it can modify its movements if it determines that it is approaching a surface of a structure or object.

Figure 10:
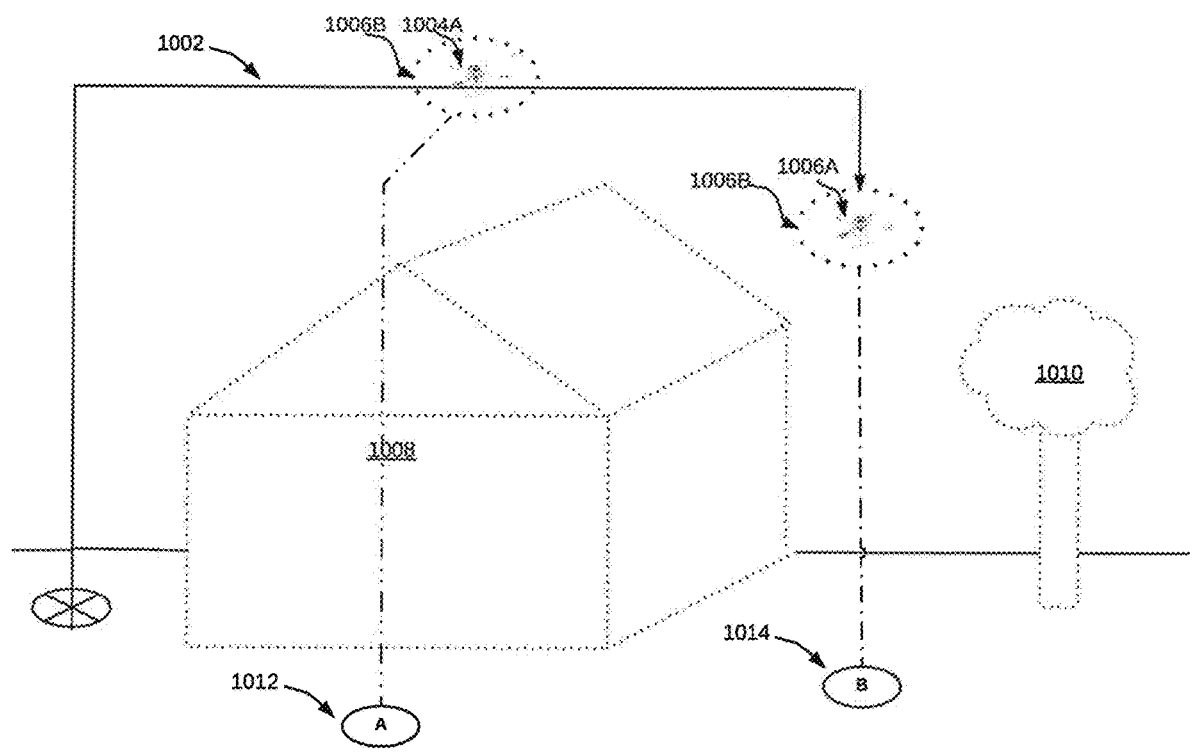

FIG. 10 is an example of a UAV determining a fastest route to return home and land from a given position around a physical structure 1008. In a first instance, the UAV 1004A is flying above the structure 1008. If a contingency event occurs, such as low battery or other failure, the UAV system may compute the fastest route to a pre-arranged landing zone 1012, for example utilizing a generated point cloud. In the second instance, the UAV 1006A is flying to the right of the structure 1008. If a contingency event occurs, the UAV 1006A may compute the fastest route to a pre-arranged landing zone 1014 point, for example utilizing a generated point cloud.

Figure 11:
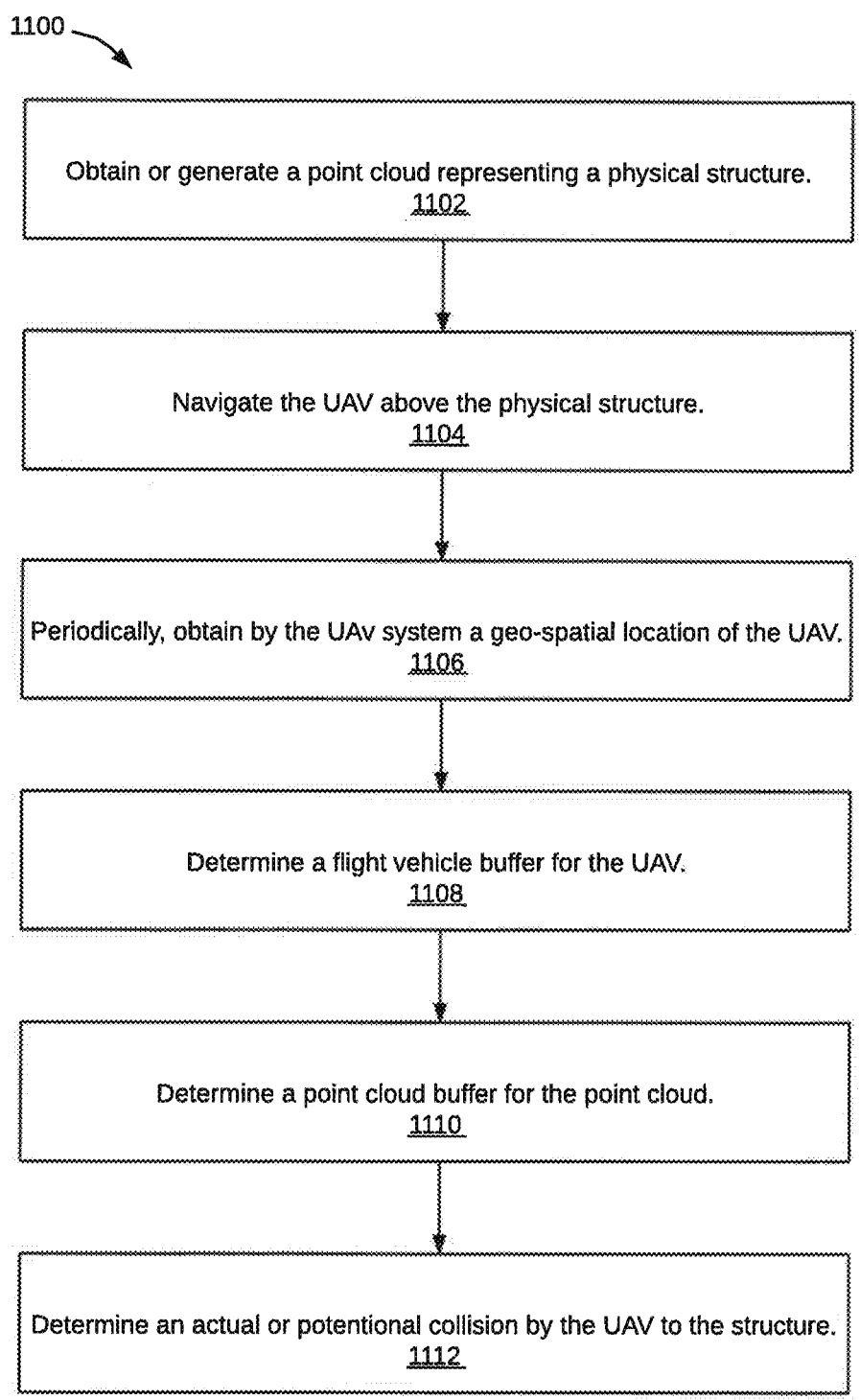
FIG. 11 illustrates an example process for determining the possibility of inflight collision to a surface represented in the point cloud.

FIG. 11 illustrates an example process 1100 for determining the possibility of inflight collision to a surface represented in the point cloud. For convenience, the process 1100 will be described as being performed by an unmanned aerial vehicle (UAV) of one or more processors.

The UAV obtains a point cloud representing a physical structure (block 1102). As described above, the UAV can utilize a point cloud during navigation to better inform whether it is may collide with a surface of a structure or object.

The UAV navigates about the physical structure (block 1104). The UAV can ascend from a take-off position, and navigate according to a flight plan about the physical structure. During navigation, the UAV periodically obtains geo-spatial locations of the UAV (block 1106), to ensure that the UAV is following the flight plan.

The UAV determines a flight vehicle buffer of the UAV (block 1108), and a point cloud buffer for the structure (block 1110). As described above, with respect to FIG. 7B, a system can determine a buffer to be assigned the UAV and structure according to respective sources of error. While the system can determine that the flight plan being implemented by the UAV is likely to not result in a collision, the UAV can further monitor likelihoods as it navigates. For example, the buffer associated with the UAV may need to be increased, or decreased, according to a measured GNSS error (e.g., as described above, with respect to FIG. 9). Additionally, the UAV can determine that the structure is located differently than indicated in the cloud point. That is, the UAV can utilize an accurate distance sensor, such as a lidar, leddar, barometer, to determine its altitude from the ground. The UAV may then determine that the structure is, for example, taller than as indicated in the point cloud (e.g., the UAV may measure its distance from the ground, then from the surface of the structure, and compare that to the points in the point cloud). This determination can cause the UAV to increase a buffer associated with the structure. Similarly, the UAV may decrease a buffer associated with the structure. Optionally, the UAV may be required to receive confirmation from an operator of a GCS prior to modifying buffer sizes.

The UAV determines an actual or potential collision (block 1112). Based on the point cloud and buffers, the UAV can determine that a particular location along a flight pattern, or while performing actions at a particular inspection location (e.g., waypoint), the UAV may collide with the structure. Upon a positive determination, the UAV can take evasive maneuvers, such as avoiding an inspection location, modifying the inspection location (e.g., as described in FIG. 7B), and so on.

Additionally, the UAV can utilize onboard distance sensors (e.g., lidar, stereo camera) to determine that the UAV is approaching a surface of a structure or object. If the UAV determines that it's approaching the surface, it can stop movement along the direction. Since the flight plan was determined to avoid such collisions, the UAV may optionally modify the point cloud to indicate that a buffer associated with the structure is to be increased. That is, the buffer may need to be increased to avoid future potential collisions.

Figure 12A:
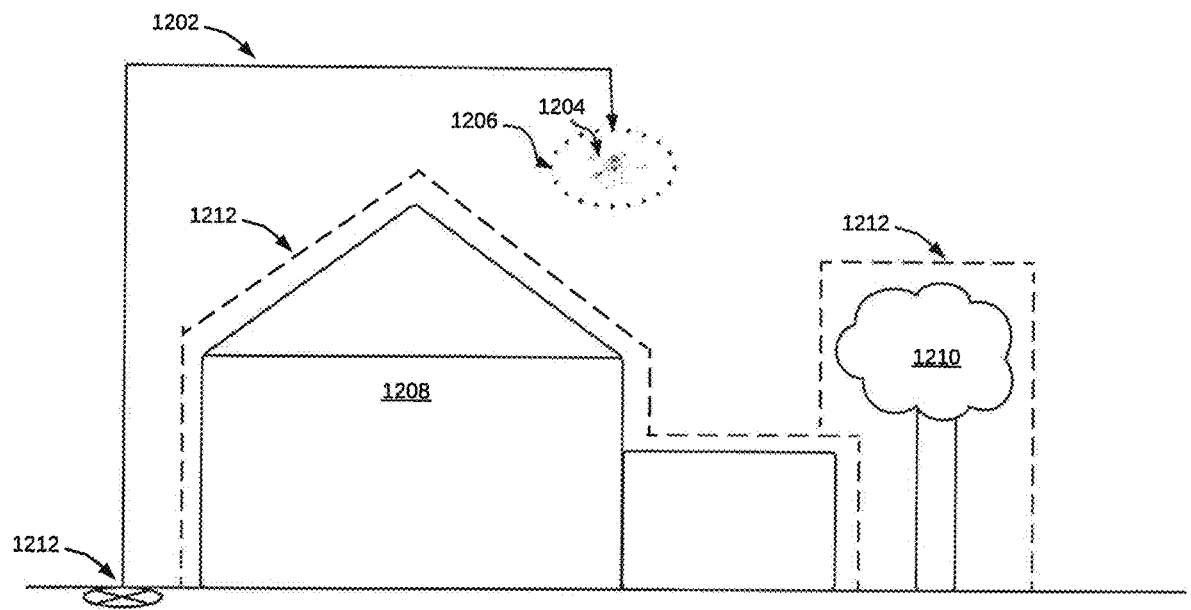
FIGS. 12A-B illustrates the example process for determining the possibility of inflight collision to a surface as represented in the point cloud.
Figure 12B:
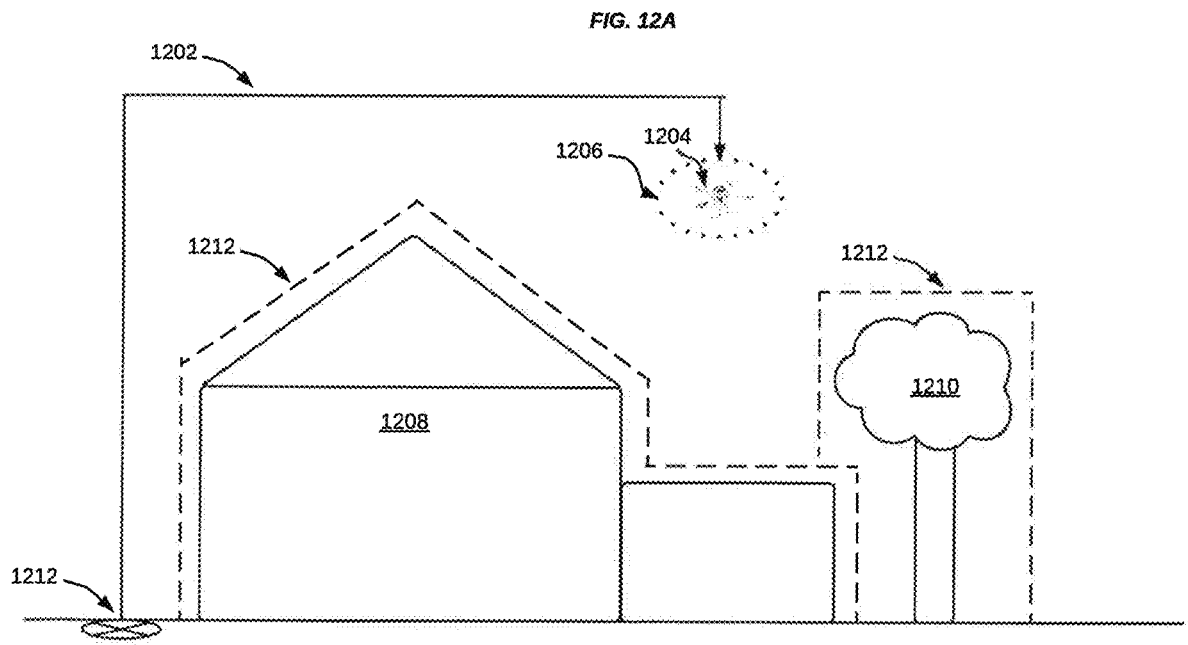

FIGS. 12A-12B illustrate the example process 1100 for determining the possibility of inflight collision to a surface as represented in the point cloud. FIG. 12A and FIG. 12B illustrate the UAV 1204 in two different positions. The first position of the UAV 1204 in FIG. 12A is located above a sloped portion of a roof of a house. The second position of the UAV 1204 in FIG. 12B is located above a flat structure, such as a garage or shed, attached to the house. The vehicle flight buffer 1206 may be represented as 3-dimensional volumetric shape around the UAV 1204.

As the UAV descends, the vehicle flight buffer 1026 is compared to the point cloud buffer. The UAV system obtains a geospatial position of the UAV, and determines an x, y, z position in the same 3-D coordinate space as the point cloud. A vehicle flight buffer is computed resulting in a volumetric perimeter around the UAV. Various x, y, z perimeter coordinates of the vehicle flight buffer are compared to x, y, z coordinates of a portion or zone of the point cloud. The process searches for possible overlap of x, y, z coordinates of the vehicle flight buffer to x, y, z coordinates of the point cloud buffer. Also, the process may predict based on a continued direction of flight whether the vehicle flight buffer will intersect with the point cloud buffer.

FIG. 13 illustrates example buffers (e.g., flight buffers, buffer associated with a UAV). FIGS. 13A-E show examples of different sized and shaped vehicle flight buffers. The vehicle flight buffer is a volume of space defined around the UAV, which may be fixed, or variable in size. The vehicle flight buffer may be of different sizes and different shapes. The vehicle flight buffer may be appropriately sized based on accuracy value for a GNSS signal of the UAV. The vehicle flight buffer may be increased in size for lower geospatial accuracy, and the vehicle flight buffer may be decreased in size for a higher geospatial accuracy. The UAV system obtains a geospatial position of the UAV, and as an example, a radius of based on the certainty of the GPS signal can be used. FIG. A illustrates ellipsoid shaped vehicle flight buffers. FIG. B illustrates circular/spherical shaped vehicle flight buffers. FIG. C illustrates a rectangular/rectangular prism. FIG. D illustrates a cylinder. FIG. E illustrates that the vehicle flight buffer size may be increased or decreased based on the perceived accuracy of the GPS signal. The vehicle flight buffer may be compared against the point cloud for a given position around the point cloud by the UAV. Any intersection with actual points of the point cloud, or of the point cloud buffer indicates a possible incursion by the UAV into the physical structure.

The vehicle flight buffer may be sized based on actual or estimated GNSS signal error. For example, the size of the flight buffer may be increased in size based on altitude above the ground. The GNSS receiver may receive multi-path signals causing error in the actual location of the UAV when close to the ground or a physical structure. The vehicle flight buffer may be sized larger, for example, when closer to the ground or a structure. The increase in size of the vehicle flight buffer can help the UAV maintain a margin of safety and reduce a possibility of collision.

Additionally, the vehicle flight buffer may be set by the flight planning system, or ground control station with a buffer level. For example, the buffer level for the vehicle flight buffer may be set based on levels, high, medium or low. Or the vehicle flight buffer could be set based on a slideable scale from low to high. The higher the level or scale, then the vehicle flight buffer would increase.

Figure 14:
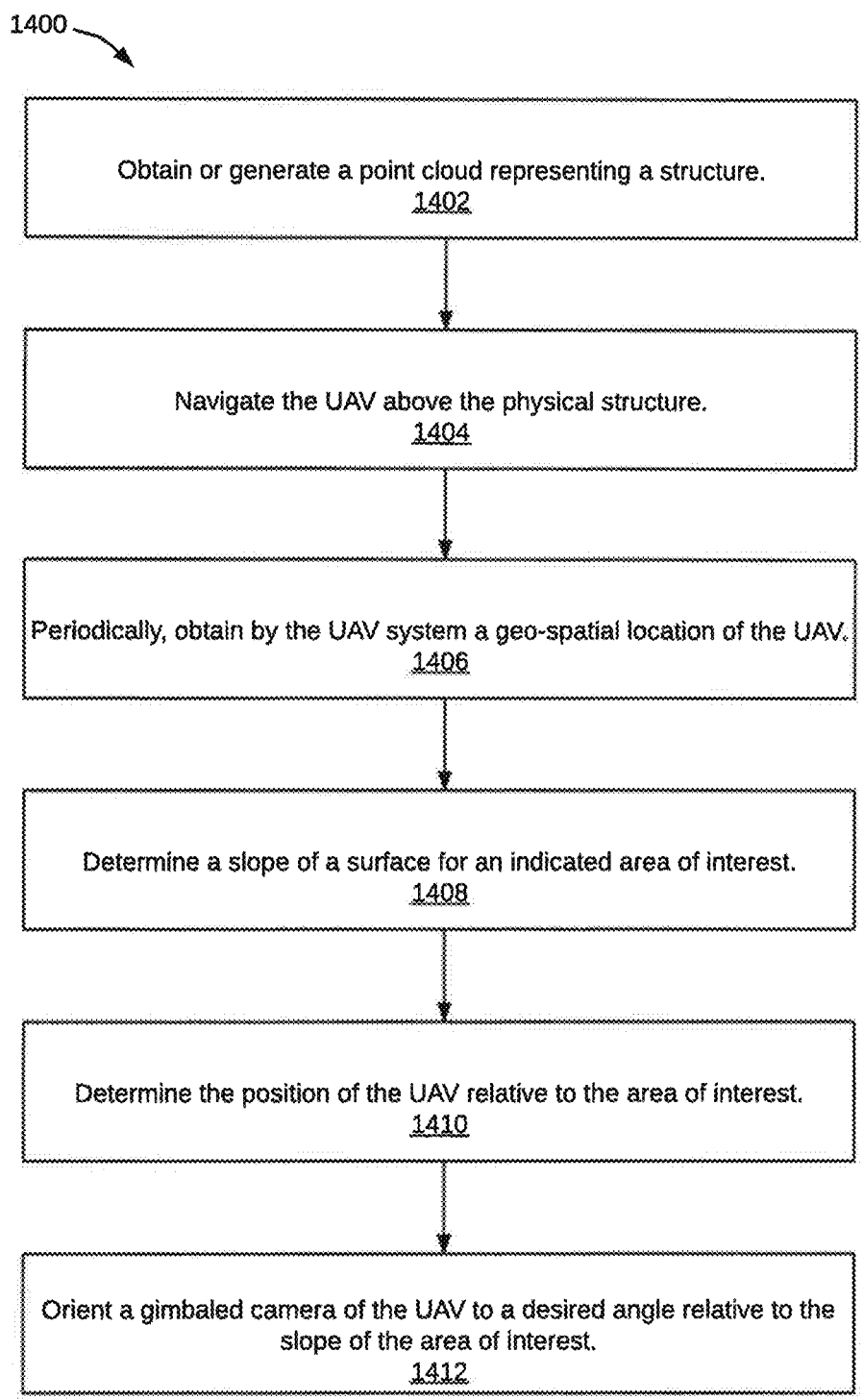
FIG. 14 illustrates an example process for determining an orientation of a fixed or gimbaled-camera given an actual position of the UAV relative the point cloud.

FIG. 14 illustrates an example process 1400 for determining an orientation of a fixed or gimbaled-camera given an actual position of a UAV relative the point cloud. For convenience, the process 1400 will be described as being performed by an unmanned aerial vehicle (UAV) of one or more processors.

The UAV obtains a point cloud representing a structure (block 1402) and navigates the UAV about the structure (block 1404) while periodically obtaining geo-spatial locations of the UAV (block 1406). As described above, a UAV can obtain a point cloud describing a geographic area that includes a structure to be inspected, and can utilize the point cloud while navigating.

The UAV determines a slope of a surface for an area of interest (block 1408). As the UAV navigates, the UAV can obtain images of the structure (e.g., a surface of the structure). The UAV can obtain images according to one or more inspection locations indicated in a received flight plan associated with the inspection. Optionally, the UAV may prefer (e.g., a user defining the flight plan may prefer) to obtain images from an orthonormal (e.g., perpendicular) direction from the surface. If the surface is flat, the UAV can simply orient a camera downwards, and obtain images from a perpendicular perspective. However, if a surface is sloped, the UAV may have to orient a gimbal controlling a pose of the camera differently.

To determine a slope of the surface, the UAV can utilize the point cloud to determine an average slope from a start of the area of interest to an end of the area of interest. As described above, an area of interest can include an area of a particular radius, representing a center of a field of view of a camera of the UAV. To determine the slope, the UAV can therefore take an average height of points located at a start of the area of interest (e.g., an average height of a collection of points) and compare the average height to an average of points located at an end of the area of interest. A slope can be therefore be determined from the comparison. Additionally, if the UAV includes a stereo camera, the UAV can generate a point cloud of the structure as it navigates (e.g., the pint cloud can be relatively sparser than the point cloud generated in FIG. 4). The UAV can similarly use this point cloud to determine a slope, or determine corrections to the point cloud received from the system.

The UAV determines its position relative to the area of interest (block 1410). The UAV can navigate according to the flight plan, and determine its location prior to obtaining an image of the area of interest. That is, the UAV can obtain GNSS readings of its location, and utilize the GNSS readings to place itself within the point cloud. In this way, the UAV can determine its location relative the area being imaged. Optionally, to ensure that the UAV is in a proper location, the UAV can utilize images obtained during navigation, with an orthomosaic of the structure (e.g., as described above, with respect to FIG. 4). The UAV may compare a field of view of its camera with an expected field of view based on the orthomosaic, and can provide corrections to its locations until the UAV is in a correct inspection location to obtain images of the area of interest.

The UAV orients a gimbaled camera to a desired angle relative to the slope of the area of interest (block 1412). To obtain images that are perpendicular from a surface of the structure, the UAV can orient its camera accordingly. That is, the UAV can determine the angle based on its location and the slope of the surface. For example, the UAV can determine a vector extending from the surface to the UAV based on the slope of the structure, and can orient its camera along the vector. Optionally, other angles can be utilized and specified in the flight plan.

Figure 15:
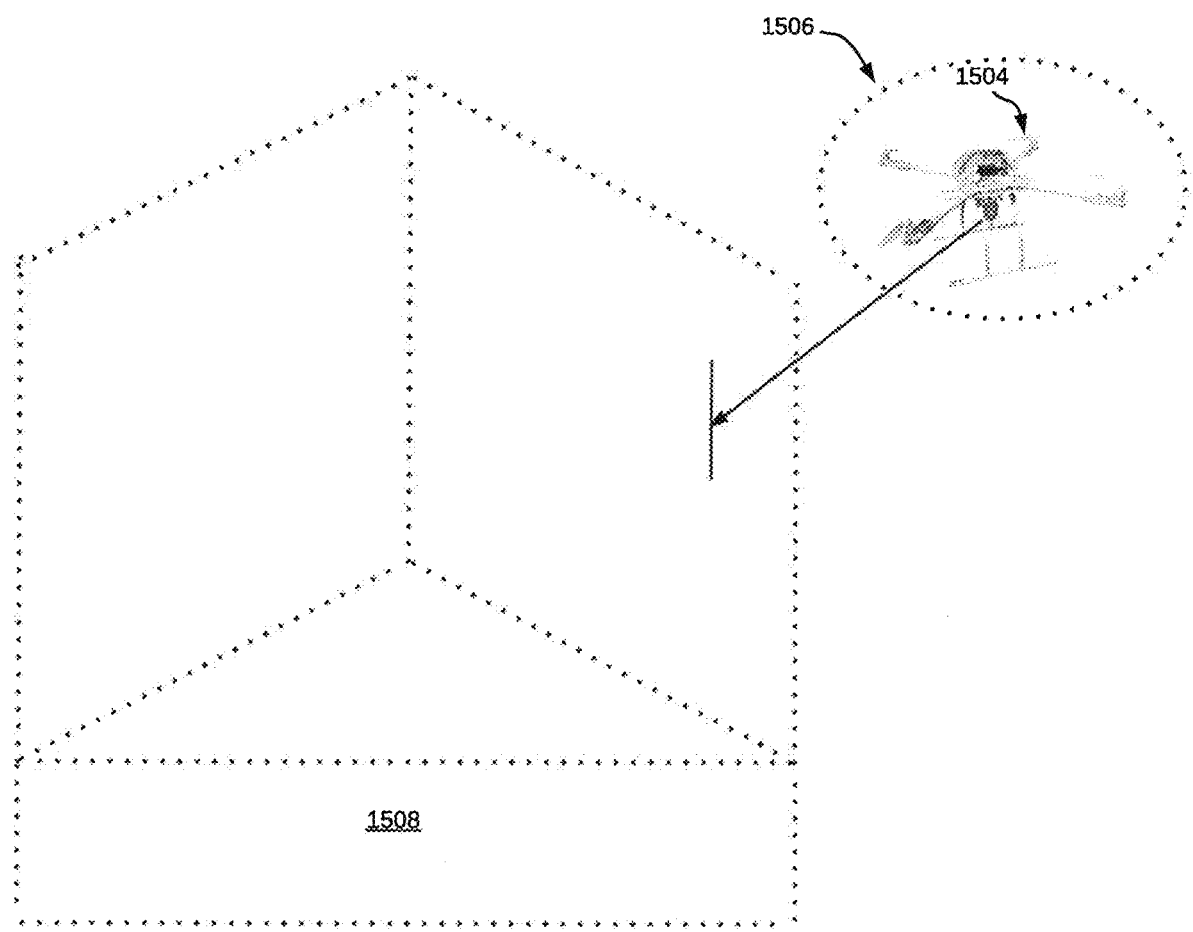
FIG. 15 illustrates an example of a UAV orienting a fixed or gimbaled-camera given an actual position of the UAV relative to a point cloud.

FIG. 15 illustrates an example of the UAV 1504 orienting a fixed or gimbaled-camera given an actual position of the UAV relative the point cloud 1506. As illustrated, the UAV 1504 is navigating about a structure 1508 (e.g., a house) and has paused (e.g., hovered) at an inspection location to obtain images of an area of interest. The UAV 1504 has determined a slope of a rooftop of the structure 1508, and has oriented a gimbal based on the slope.

Various types of UAVs may be used to implement the inventions described herein (for example, a fixed wing airplane, helicopter, a multi-rotor vehicle (e.g., a quadcopter in single propeller and coaxial configurations), a vertical takeoff and landing vehicle, lighter than air aircraft). A multi-rotor vehicle in a coaxial configuration may use the same propeller pitch and diameter propellers, use different pitch and diameter propellers, or variable pitch propellers. In this specification, UAVs, such as drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid-state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module" as used herein refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module or block is necessary or indispensable. The novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method performed by an unmanned aerial vehicle (UAV) system comprising one or more processors, the method comprising:
    obtaining a point cloud representing a physical structure;
    determining a point cloud buffer by simulating whether the UAV will collide with the physical structure using the point cloud, wherein the point cloud buffer extends from a surface of the physical structure represented by the point cloud;
    determining a flight path for the UAV about the physical structure based upon the point cloud and the point cloud buffer; and
    navigating the UAV according to the flight path.

2. The method of claim 1, wherein obtaining a point cloud comprises:
    conducting by the UAV an aerial survey of the physical structure thereby generating one or more images including a portion of the physical structure, and one or more images including a representation of a ground control point marker; and
    generating the point cloud using the one or more images of the physical structure and of the ground control point marker.

3. The method of claim 1, wherein determining the flight path comprises:
    receiving one or more inspection locations about the physical structure for inspection by the UAV, wherein the one or more inspection locations identify an area to obtain one or more aerial images of the physical structure; and
    determining in reference to the point cloud and the point cloud buffer, a flight path for the UAV to navigate to each inspection location.

4. The method of claim 1, further comprising:
    determining a flight vehicle buffer for the UAV; and
    determining an actual or potential collision by the UAV to a surface of the physical structure based upon the flight vehicle buffer and the point cloud buffer.

5. The method of claim 4, wherein the flight vehicle buffer is a pre-determined volumetric perimeter around the UAV.

6. The method of claim 1, further comprising:
determining an occurrence of a contingency event;
calculating a contingency landing zone based in reference to the point cloud; and
navigating the UAV to the contingency landing zone.

7. The method of claim 1, further comprising:
obtaining by the UAV a geo-spatial location of the UAV while navigating about the physical structure;
determining a slope of a surface of the physical structure for an area of interest;
using the point cloud, determining a position of the UAV relative to the area of interest; and
orienting a gimballed camera of the UAV to a desired angle relative to the slope of the area of interest.

8. An unmanned aerial vehicle (UAV) system comprising one or more processors, and a computer storage media storing instructions, that when executed by the one or more processors, cause the one or more processors to perform operations comprising:
obtaining a point cloud representing a physical structure;
determining a point cloud buffer by simulating whether the UAV will collide with the physical structure using the point cloud, wherein the point cloud buffer extends from a surface of the physical structure represented by the point cloud;
determining a flight path for the UAV about the physical structure based upon the point cloud and the point cloud buffer; and
navigating the UAV according to the determined flight path.

9. The system of claim 8, wherein the operations further comprise:
conducting by the UAV an aerial survey of the physical structure thereby generating one or more images including a portion of the structure, and one or more images including a representation of a ground control point marker; and
generating the point cloud using the one or more images of the structure and of the ground control point marker.

10. The system of claim 8, wherein determining the flight path comprises:
receiving one or more inspection locations about the physical structure for inspection by the UAV, wherein the one or more inspection locations identify an area to obtain one or more aerial images of the physical structure; and
determining in reference to the point cloud, a flight path for the UAV to navigate to each inspection location.

11. The system of claim 8, wherein the operations further comprise:
determining a flight vehicle buffer for the UAV; and
determining an actual or potential collision by the UAV to a surface of the physical structure based upon the flight vehicle buffer and the point cloud buffer.

12. The system of claim 11, wherein the flight vehicle buffer is a pre-determined volumetric perimeter around the UAV.

13. The system of claim 8, wherein the operations further comprise:
determining an occurrence of a contingency event;
calculating a contingency landing zone based in reference to the point cloud; and
navigating the UAV to the contingency landing zone.

14. The system of claim 8, wherein the operations further comprise:
obtaining by the UAV a geo-spatial location of the UAV while navigating about the physical structure;
determining a slope of a surface of the physical structure for an area of interest;
using the point cloud, determining a position of the UAV relative to the area of interest; and
orienting a gimballed camera of the UAV to a desired angle relative to the slope of the area of interest.

15. A non-transitory computer storage medium comprising instructions that when executed by one or more process included of an unmanned aerial vehicle (UAV) system, cause the UAV system to perform operations comprising:
obtaining a point cloud representing a physical structure;
determining a point cloud buffer by simulating whether the UAV will collide with the physical structure using the point cloud, wherein the point cloud buffer extends from the surface of the physical structure represented by the point cloud;
determining a flight path for the UAV about the physical structure based upon the point cloud and the point cloud buffer; and
navigating the UAV according to the flight path.

16. The non-transitory computer storage medium of claim 15, wherein the operations further comprise:
conducting by the UAV an aerial survey of the physical structure thereby generating one or more images including a portion of the structure, and one or more images including a representation of a ground control point marker; and
generating the point cloud using the one or more images of the physical structure and of the ground control point marker.

17. The non-transitory computer storage medium of claim 15, wherein determining the flight path comprises:
receiving one or more inspection locations about the physical structure for inspection by the UAV, wherein the one or more inspection locations identify an area to obtain one or more aerial images of the physical structure; and
determining in reference to the point cloud, a flight path for the UAV to navigate to each inspection location.

18. The non-transitory computer storage medium of claim 15, wherein the operations further comprise:
determining a flight vehicle buffer for the UAV; and
determining an actual or potential collision by the UAV to a surface of the physical structure based upon the flight vehicle buffer and the point cloud buffer.

19. The non-transitory computer storage medium of claim 18, wherein the flight vehicle buffer is a pre-determined volumetric perimeter around the UAV.

20. The non-transitory computer storage medium of claim 15, wherein the operations further comprise:
determining an occurrence of a contingency event;
calculating a contingency landing zone based in reference to the point cloud; and
navigating the UAV to the contingency landing zone.

21. The non-transitory computer storage medium of claim 15, wherein the operations further comprise:
obtaining by the UAV a geo-spatial location of the UAV while navigating about the physical structure;
determining a slope of a surface of the physical structure for an area of interest;
using the point cloud, determining a position of the UAV relative to the area of interest; and orienting a gimballed camera of the UAV to a desired angle relative to the slope of the area of interest.

* * * * *